(12) United States Patent
Duffy et al.

(10) Patent No.: US 12,079,908 B2
(45) Date of Patent: Sep. 3, 2024

(54) GENERATING ARTWORK TUTORIALS

(71) Applicant: SOCIETE BIC, Clichy (FR)

(72) Inventors: David Duffy, Clichy (FR); Bernadette Elliott-Bowman, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 163 days.

(21) Appl. No.: 17/547,942

(22) Filed: Dec. 10, 2021

(65) Prior Publication Data

US 2022/0230370 A1 Jul. 21, 2022

(30) Foreign Application Priority Data

Jan. 18, 2021 (EP) .................................... 21305051

(51) Int. Cl.
*G06T 11/60* (2006.01)
*G06F 3/01* (2006.01)
(Continued)

(52) U.S. Cl.
CPC .......... *G06T 11/60* (2013.01); *G06F 3/03545* (2013.01); *G06F 3/04845* (2013.01); *G06T 11/40* (2013.01); *G09B 11/10* (2013.01); *G06F 3/016* (2013.01); *G06F 3/0346* (2013.01); *G06T 11/001* (2013.01); *G06V 10/70* (2022.01)

(58) Field of Classification Search
CPC ........ G06T 11/60; G06T 11/40; G06T 11/001; G06F 3/03545; G06F 3/04845; G06F 3/016; G06F 3/0346; G09B 11/10; G06V 10/70

See application file for complete search history.

(56) References Cited

U.S. PATENT DOCUMENTS

| | | | |
|---|---|---|---|
| 5,513,991 A | 5/1996 | Reynolds et al. | |
| 7,205,995 B1 | 4/2007 | Hod et al. | |
| 9,254,099 B2 * | 2/2016 | Connor | G16H 20/60 |
| 10,314,492 B2 * | 6/2019 | Connor | A61B 5/681 |
| 2004/0205483 A1 * | 10/2004 | Massarsky | G06T 11/001 |
| | | | 715/273 |

(Continued)

FOREIGN PATENT DOCUMENTS

| | | |
|---|---|---|
| CN | 106355973 B | 1/2017 |
| KR | 20200039178 A | 4/2020 |

OTHER PUBLICATIONS

Extended European Search Report issued on Jun. 2, 2021 in counterpart European Patent Application No. 21305051.1 (9 pages, in English).

(Continued)

*Primary Examiner* — YuJang Tswei
(74) *Attorney, Agent, or Firm* — Bookoff McAndrews, PLLC

(57) ABSTRACT

A computer-implemented method and an apparatus for generating an action-to-feature mapping of a visual artwork may include initializing a system to create a visual artwork in, and obtaining an input stream of data recording a creation of a visual artwork from the system, and identifying, based on the input stream of data, at least one time series of utensil actions capable of reproducing the visual artwork, and obtaining at least one image of the visual artwork, and generating the action-to-feature mapping based on the at least one time series of utensil actions and on the at least one image of the visual artwork, thereby recognizing at least one artistic feature of the visual artwork. The action-to-feature mapping may include at least one pair of at least one utensil action of the at least one time series of utensil actions and the at least one artistic feature.

20 Claims, 9 Drawing Sheets

(51) Int. Cl.
| | | |
|---|---|---|
| *G06F 3/0346* | (2013.01) | |
| *G06F 3/0354* | (2013.01) | |
| *G06F 3/04845* | (2022.01) | |
| *G06T 11/00* | (2006.01) | |
| *G06T 11/40* | (2006.01) | |
| *G06V 10/70* | (2022.01) | |
| *G09B 11/10* | (2006.01) | |

(56) References Cited

U.S. PATENT DOCUMENTS

| | | | | |
|---|---|---|---|---|
| 2009/0068625 | A1* | 3/2009 | Petro | G09B 1/00 434/167 |
| 2014/0289663 | A1* | 9/2014 | Zhang | G06T 15/02 715/771 |
| 2015/0310305 | A1* | 10/2015 | Fang | G06T 11/001 345/441 |
| 2018/0130247 | A1* | 5/2018 | Yaniv | G10H 1/32 |
| 2018/0240257 | A1* | 8/2018 | Li | G06V 10/774 |
| 2018/0338065 | A1* | 11/2018 | Zyskind | G06F 3/0442 |
| 2019/0147627 | A1* | 5/2019 | Chen | G06T 9/002 345/157 |
| 2020/0020165 | A1* | 1/2020 | Tran | G06F 3/011 |
| 2020/0151938 | A1* | 5/2020 | Shechtman | G06N 3/045 |
| 2020/0311990 | A1* | 10/2020 | Chen | G06V 30/387 |
| 2021/0382936 | A1* | 12/2021 | Tomar | G06N 20/00 |

OTHER PUBLICATIONS

Xie Ning et al. "Stroke-based stylization by learning sequential drawing examples", Journal of Visual Communication and Image Representation, Academic Press, Inc, US, vol. 51, Jan. 4, 2018 (11 pages, in English).

Yger Florian et al. "Recognizing Art Style Automatically with deep learning", Proceedings of Machine Learning Research, PMLR, Jan. 1, 2017 (18 pages, in English).

Extended European Search Report issued on May 3, 2021 in counterpart European Patent Application No. 21305050.3 (12 pages, in English).

Yu Zang et al., "Stroke Style Analysis for Painterly Rendering", Journal of Computer Science and Technology, Science Press, Beijing, CN, vol. 28, No. 5, Sep. 17, 2013 (15 pages, in English).

Ravneet Singh Arora et al., "Towards automated classification of fine-art painting style: A comparative study", Pattern Recognition (ICPR), 2012 21st International Conference On, IEEE, Nov. 11, 2012 (Nov. 11, 2012), (4 pages, in English).

Ahmed Selim et al. "Painting style transfer for head portraits using convolutional neural networks", ACM Transactions pf Graphics, ACM, NY, US, vol. 35, No. 4, Jul. 11, 2016 (18 pages, in English).

Lee, Yong Jae et al. "ShadowDraw: Real-Time User Guidance for Freehand Drawing", ACM Transactions of Grpahics, vol. 30, No. 4, Jul. 31, 2011 (9 pages, in English).

Emmanuel Iarussi et al. "The drawing assistant: automated drawing guidance and feedback for photographs", Proceedings of the 26th Annual ACM Symposium of User Interface Software and Technology, UIST '13, Jan. 1, 2013 (11 pages, in English).

Luca Benedetti et al. "Painting with Bob: Assisted Creativity for Novices", User Interface Software and Technology, ACM, 2 Penn Plaza, Suite 701 New York, NY 10121-0701 USA, Oct. 5, 2014 (10 pages, in English).

Li, Guanbin et al. "ColorSketch: A Drawing Assistant for Generating Color Sketches from Photos", IEEE Computer Graphics and Applications, vol. 38, No. 3, Mar. 18, 2016 (12 pages, in English).

* cited by examiner

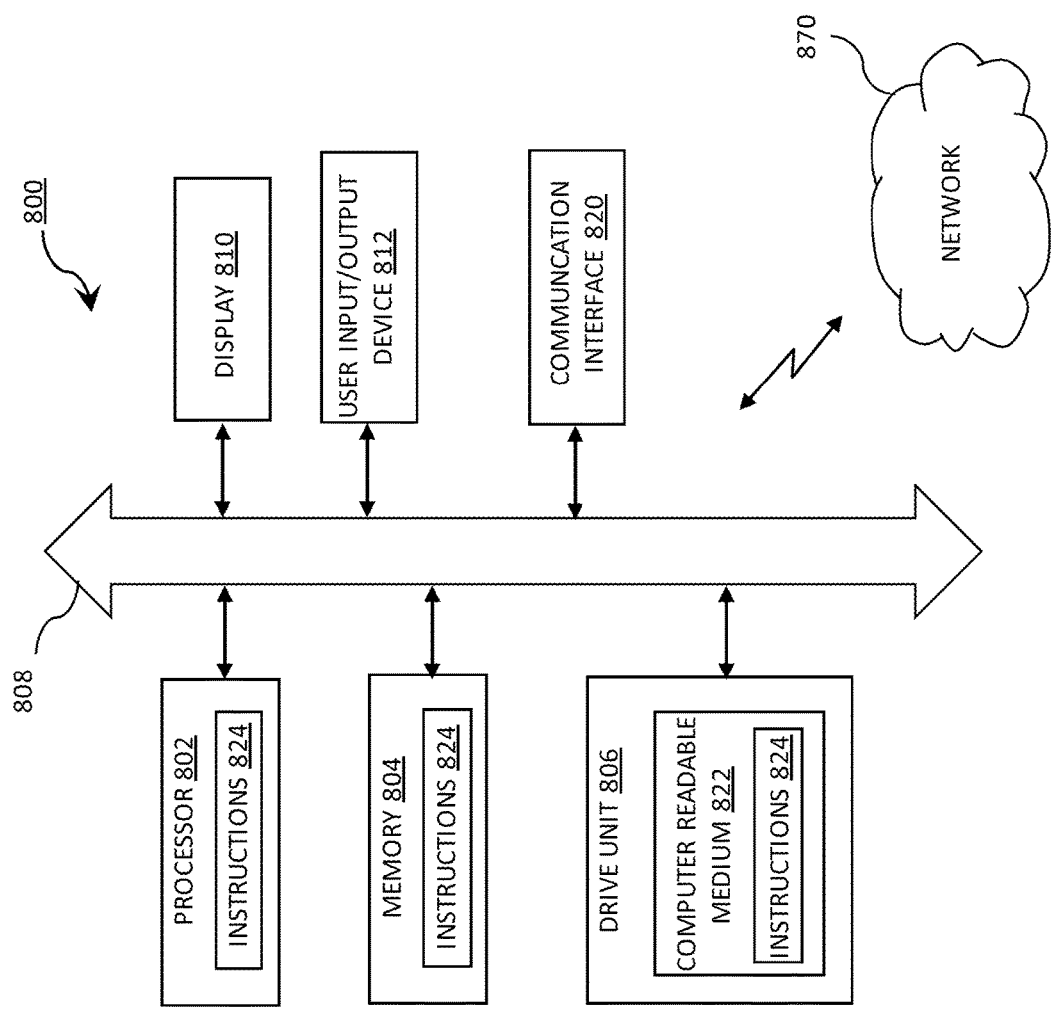

GENERATING ARTWORK TUTORIALS

CROSS REFERENCE TO RELATED APPLICATIONS

This application claims priority from European patent application No. 21305051.1, filed on Jan. 18, 2021, the contents of which are hereby incorporated herein in their entirety by this reference.

TECHNICAL FIELD

This specification relates to a computer-implemented method for generating an action-to-feature mapping of a visual artwork, a system for generating an action-to-feature mapping of a visual artwork; and a distributed visual artwork system.

BACKGROUND

Computer-implemented algorithms can be applied in the realm of (visual) artworks. As an example, a visual artwork can be a painting or a drawing. In this case, the brush or pen strokes of an artist can be learnt from the brush or pen motion itself and can be used to generate art in the artist's style. Non-personalized creative tutorials guiding a user in creating a visual artwork are known and ubiquitous (e.g. in terms of videos on YouTube or elsewhere).

SUMMARY

According to a first aspect, there is provided a computer-implemented method for generating an action-to-feature mapping of a visual artwork. The method comprises initializing a system to create a visual artwork in. The method further comprises obtaining an input stream of data recording a creation of a visual artwork from the system. The method further comprises identifying, based on the input stream of data, at least one time series of utensil actions capable of reproducing the visual artwork. The method further comprises obtaining at least one image of the visual artwork. The method further comprises generating the action-to-feature mapping based on the at least one time series of utensil actions and on the at least one image of the visual artwork, thereby recognizing at least one artistic feature of the visual artwork. The action-to-feature mapping comprises at least one pair of at least one utensil action of the at least one time series of utensil actions and the at least one artistic feature.

According to a second aspect, there is provided a computer-implemented method for generating and running a creative tutorial algorithm for creating a visual artwork. The method comprises obtaining data defining a creative objective and identifying the creative objective based on the data defining the creative objective. The method further comprises obtaining information about at least one targeted artistic style and identifying the at least one targeted artistic style based on the information about the at least one targeted artistic style. The method further comprises accessing a plurality of predetermined artistic styles and identifying, based on the plurality of predetermined artistic styles, at least one predetermined artistic style matching the at least one targeted artistic style, thereby specifying at least one targeted predetermined artistic style. The method further comprises generating the creative tutorial algorithm. The creative tutorial algorithm is configured to comprise one or more instructions on how to reproduce the creative objective in terms of the at least one targeted predetermined artistic style.

According to a third aspect, there is provided a (first) system for generating an action-to-feature mapping of a visual artwork, wherein the (first) system is configured to run the computer-implemented method of the first aspect (or an embodiment thereof) for generating the action-to-feature mapping of a visual artwork.

According to a fourth aspect, there is provided a (second) system for generating and running a creative tutorial algorithm for a visual artwork, wherein the (second) system is configured to run the computer-implemented method of the second aspect (or an embodiment thereof) for generating and running a creative tutorial algorithm for creating a visual artwork.

According to a fifth aspect, there is provided a distributed visual artwork system. The distributed visual artwork system comprises at least one first system of the third aspect (or an embodiment thereof) for generating an action-to-feature mapping of a visual artwork. The distributed visual artwork system further comprises at least one second system of the fourth aspect (or an embodiment thereof) for generating and running a creative tutorial algorithm for a visual artwork. The distributed visual artwork system further comprises at least one artistic style database. The at least one first system is configured to communicate with the at least one artistic style database via a first data channel, and the at least one second system is configured to communicate with the at least one artistic style database via a second data channel.

Dependent embodiments of the aforementioned aspects are given in the dependent claims and explained in the following description, to which the reader should now refer.

The method according to the first aspect (or an embodiment thereof) and the method of the second aspect (or an embodiment thereof) represent two different, but interrelated, uses of the (first) system of the third aspect (or an embodiment thereof) and/or the (second) system of the fourth aspect (or an embodiment thereof). Furthermore, the distributed visual artwork system of the fifth aspect comprises both the systems of the third and fourth aspect. Hence, all aspects (the first, the second, the third, the fourth, the fifth) are interrelated.

Methods and/or systems of the aforementioned aspects of this specification are directed to providing personalized (i.e. user-defined) creative tutorials guiding a (tutorial) user through creating a visual artwork, and, hence, enabling the (tutorial) user to create the visual artwork. A creative tutorial is personalized in that the creative tutorial is not prefabricated for one or more (tutorial) users (such would, in fact, be referred to as a non-personalized creative tutorial) and it is based on (tutorial) user choices. In fact, for instance, the (tutorial) user may pick a creative object she or he is interested in creating an artwork for. Alternatively, or in addition, the (tutorial) user may choose to create the creative object in a particular (artistic) style. As another example, a choice may also comprise changing a perspective of a scene (e.g. via 3D rendering) and/or a lighting condition.

An artwork is an artistic creation of aesthetic value and/or beauty. A visual artwork refers to or comprises an artwork that is visible (e.g. to human beings) and/or tangible, or that features one or more physical forms of visual art. A visual artwork refers to or comprises visual fine art, decorative art and/or applied art. However, aesthetic value and/or beauty may be relative in that what an artwork is may e.g. depend on the (tutorial) user, in particular on its age. In fact, the systems and methods of the aforementioned aspects of this specification may advantageously be used by an infant (tutorial) user on educational terms. As an example, a child may want to be guided through realistically drawing a rather difficult object, such as e.g. an elephant. On the other hand, as another example, a non-infant (tutorial user) may be more interested in painting a holiday picture or a still life in terms of a well-known artistic style (such as e.g. neoclassicism, impressionism, expressionism, cubism, surrealism, . . . ).

The visual artwork may comprise or be a painting. Alternatively, or in addition, the visual artwork may comprise or be a drawing. Alternatively, or in addition, the visual artwork may comprise or be a handwriting, in particular (a) calligraphy. Alternatively, the visual artwork may comprise or be a 3D object. In fact, the 3D object may e.g. comprise or be a sculpture (e.g. of clay, wood, or stone) or a handicraft work (e.g. of paper or cardboard). The visual artwork may be created by a series of actions carried out by a utensil. The utensil can e.g. be a pen, a brush, a smart pen, a knife. Alternatively, or in addition, the utensil can also be one or more hands of the (tutorial/expert) user. A (utensil) action is a step in creating the visual artwork and may e.g. comprise a (brush) stroke, a scrape with a knife (e.g. when creating a 3D object), or molding by hand.

Personalizing the creative tutorial can be seen as an interaction that advantageously helps in engaging the (tutorial) user with a creative project. In fact, as far as the (tutorial) user is concerned, the personalized creative tutorial may reduce frustration and increase fun while creating an artwork. Apart from choosing a user-defined creative objective and/or artistic style, this may also be attributed to the fact, that the (tutorial) user may further set her or his creative goal, select a skill level, and/or pick a utensil/tool. It also encourages the (tutorial) user to experiment with different choices. In so doing, the (tutorial) user is enabled to analyze, learn, and/or copy an artistic style. Hence, the methods and/or systems of the aforementioned aspects of this specification can be advantageously used in teaching and education.

The (interactive) creative tutorial results from running the creative tutorial algorithm generated in the method of the second aspect (or an embodiment thereof). The method according to the second aspect (or an embodiment thereof) generates, based on an (expert) user creating a visual artwork, e.g. an action-to-feature mapping of a visual artwork that can be used in the method according to the first aspect (or an embodiment thereof) for generating and using the creative tutorial. In contrast to a creative tutorial not generated based on (expert) user input, the method according to the second aspect (or an embodiment thereof) is advantageous in that instructions can be complete, realistic, and accurate. As an example, if instructions are (automatically) derived from an image of the visual artwork after its completion, actions such as e.g. strokes may be unrealistic, e.g. in a wrong order.

The system according to the fifth aspect (or an embodiment thereof) is advantageously used to enable one or more (tutorial) users to query input from one or more (expert) users needed to generate the creative tutorial. It may advantageously also be used to bring (tutorial) users and/or (expert) users together (i.e. on a virtual marketplace). In so doing, information and/or results between them can be shared and discussed.

FIGURE DESCRIPTION

FIG. 1a schematically illustrates a computer-implemented method according to the first aspect for generating an action-to-feature mapping of a visual artwork.

FIG. 1b schematically illustrates a computer-implemented method according to the second aspect for generating and running a creative tutorial algorithm for creating a visual artwork.

FIG. 2a schematically illustrates an example system according to the third aspect for generating an action-to-feature mapping of a visual artwork and/or according to the fourth aspect for generating and running a creative tutorial algorithm for a visual artwork, comprising a smart utensil.

FIG. 2b schematically illustrates an example system according to the third aspect and/or according to the fourth aspect, comprising a pen, a ballpoint pen, a fountain pen, a felt-tip pen, a pencil, a digital pen, a brush, a knife, a spatula, a palette knife, or a chisel.

FIG. 8 illustrates an implementation of a general computer system that may execute techniques presented herein.

DETAILED DESCRIPTION

Methods and/or systems of the aforementioned aspects of this specification are directed to providing personalized creative tutorials guiding a (tutorial) user through creating a visual artwork, and, hence, enabling the (tutorial) user to create the visual artwork. As an example, an infant (tutorial) user may want to learn how to draw or paint an elephant (creative objective 261) in a targeted artistic style 263, see FIG. 5a-b. The corresponding creative tutorial generated according to the method of the second aspect (or an embodiment thereof) is illustrated in FIG. 5c. A targeted artistic style can be applied to the creative objective by means of an action-to-feature mapping generated according to the method of the first aspect (or an embodiment thereof) based on a visual artwork created by an (expert) user.

Implementations described herein may provide guided tutorials to users to create visual artwork in an efficient and time-saving manner by taking advantage of modern technology infrastructure and reduces the amount of computing resources required to provide guided tutorials. For example, the present disclosure leverages a machine learning model to automatically determine relevant tutorials that a user may be interested in and/or need at a given time. Embodiments described herein may obtain, receive, or otherwise procure information and data from the smart utensil. Embodiments analyze this information, learn from this information, and then develop guided tutorials to simplify the complex and time-consuming tasks of creating visual artwork.

Figure 1A:
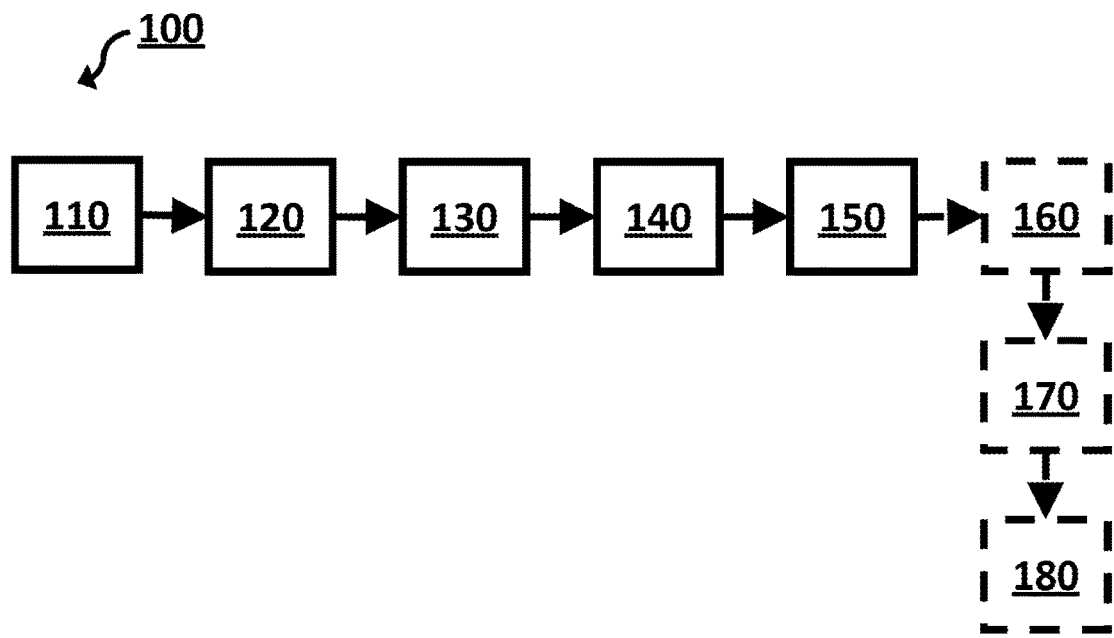
Figure 6:
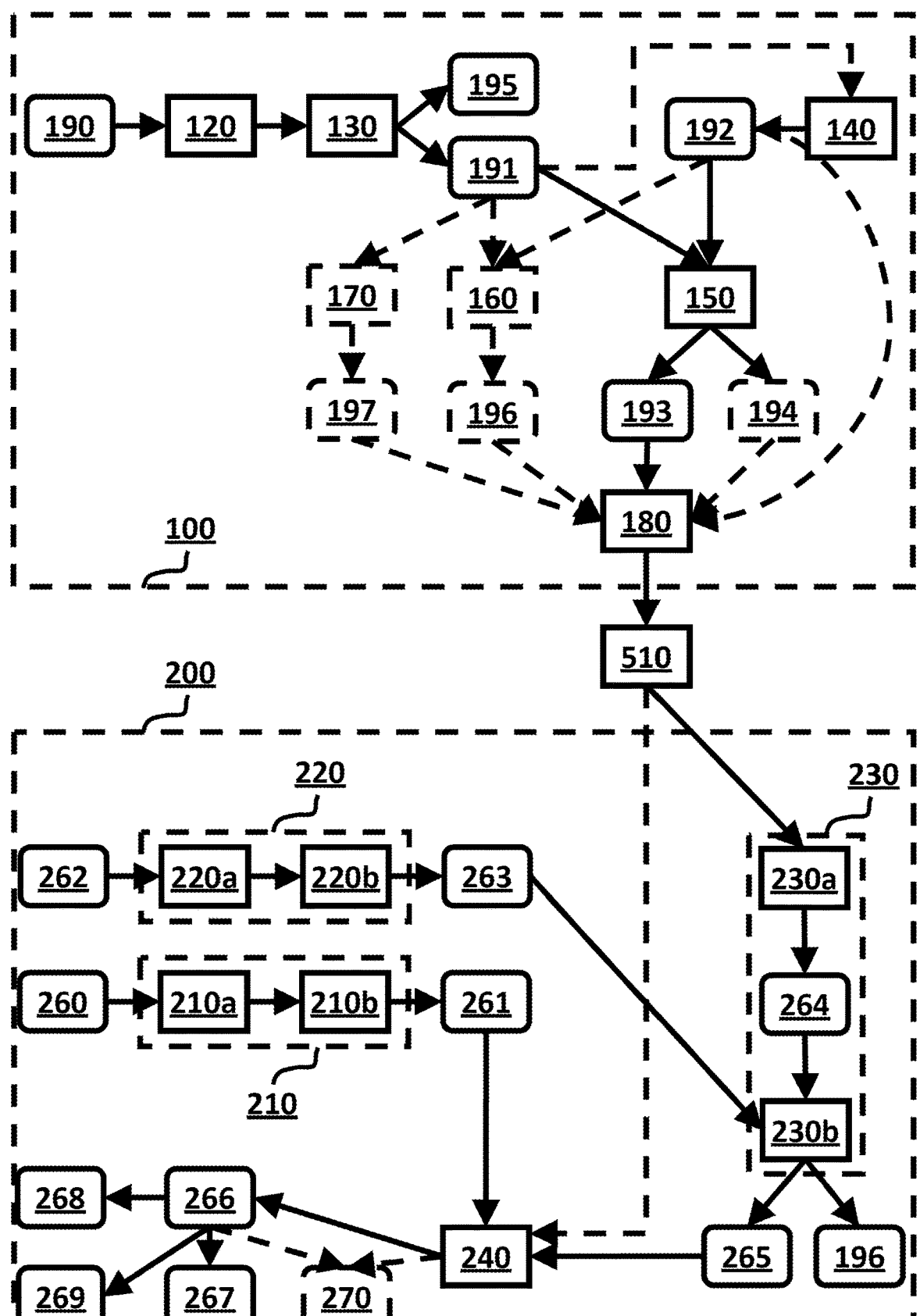
FIG. 6 shows an example embodiment of the computer-implemented method according to the first aspect linked to the computer-implemented method according to the second aspect via an artistic style database.

FIG. 1a schematically illustrates the computer-implemented method according to the first aspect for generating an action-to-feature mapping of a visual artwork. The computer-implemented method 100 for generating an action-to-feature 193 mapping of a visual artwork 10, comprises initializing 110 a system 300 in which to create a visual artwork. The visual artwork may be visible to the human eye directly (e.g. by using a pen on a sheet of paper) or indirectly upon reproduction on a screen (e.g. by using a digital pen without a visible trace). Initialization can be trivial or fully automated. The method further comprises obtaining 120 an input stream of data 190 recording a creation of a visual artwork from the system. The method further comprises identifying 130, based on the input stream of data 190, at least one time series of utensil actions 191, as shown in FIG. 6, capable of reproducing the visual artwork. The capability of reproducing the visual artwork can be weakened in that a sufficiently high degree of reproduction also suffices. The method further comprises obtaining 140 (e.g. after completion of the artwork) at least one image 192 of the visual artwork (e.g. using a camera or various sensors). In case of 3D objects, multiple images (e.g. from different perspectives) can be obtained. The method further comprises generating 150 the action-to-feature mapping 193 based on the at least one time series of utensil actions 191 and on the at least one image 192 of the visual artwork, thereby recognizing at least one artistic feature 194 of the visual artwork. The action-to-feature mapping 193 comprises at least one pair of at least one utensil action 195 of the at least one time series of utensil actions 191 and the at least one artistic feature 194.

The visual artwork may comprise (or be) a painting and/or a drawing. Alternatively, or in addition the visual artwork may comprise (or be) handwriting, a calligraphy, and/or a sculpture. The system 300 may comprise at least one smart utensil 330. As an example, the at least one smart utensil comprises a smart pen 331, a smart brush 332, and/or a smart wrist device 333. Alternatively, the utensil can be one or more of a pen, a ballpoint pen, a fountain pen, a felt-tip pen, a pencil, a digital pen, a brush, a knife, a spatula, a palette knife, a chisel 340, 440, or one or two hands of an (expert) user. The at least one smart wrist device 333 is advantageous for recording the creation of the visual artwork in case of a 3D object. In case of a smart utensil 330, the data 190 may comprise utensil track data comprising motion data of the at least one smart utensil 330. The data 190 can be in a machine-readable format.

The system 300 may comprise a medium the visual artwork is created on or in. As an example, the medium may comprise a sheet of paper. Alternatively, the medium may comprise a digital sheet configured to be used with a smart utensil 330. As examples, digital sheet may comprise a touchpad, a touch screen, or a graphics tablet. Furthermore, the system 300 may comprise an image capturing subsystem 320, optionally at least one camera 350. The smart utensil may or may not have a camera.

Initializing 110 the system 300 to create a visual artwork in may comprise applying an initialization algorithm configured to establish a coordinate system of a portion of the medium. The coordinate system can be a set of valid coordinates for the portion of the medium the visual artwork is meant to be created in or on. The portion of the medium can be the entire medium or a surface of the medium. The initialization algorithm may further be configured to prompt at least one user interaction via a user interface 360 of the system 300 guiding an (expert) user of the system to create at least one fiducial on or in the portion of the medium and to receive a confirmation indicating that the at least one fiducial is completed via the user interaction. Each of the one or more fiducials can comprise at least one line drawn or painted to define an edge or a corner so as to delimit the portion of the medium. Alternatively, a fiducial can e.g. be a dot or a cross in a corner of the portion of the medium. The initialization algorithm is further configured to recognize the portion of the medium delimited by the one or more fiducials, thereby establishing the coordinate system of the portion of the medium. In case of at least one camera, the initialization algorithm can be further configured to establish the coordinate system of the portion of the medium based on at least one image of the medium captured via the image capturing subsystem 320.

In case of a smart utensil, obtaining 120 the input stream of the data 190 recording the creation of the visual artwork from the system 300 may comprise recording at least one time series of utensil track data of the smart utensil 330 as the creation of the visual artwork progresses until completion, and identifying the at least one time series of utensil track data as the input stream of the data. The completion can be automatically determined based on a significant change or idleness in the at least one time series of utensil track data, or based on user input via the user interface. Alternatively (e.g. without a smart utensil 330), or in addition, obtaining 120 the input stream of the data 190 recording the creation of the visual artwork from the system 300 may comprise capturing, via the image capturing subsystem 320, at least one time series of images as the creation of the visual artwork progresses until completion. In this case, obtaining 120 the input stream of the data 190 recording the creation of the visual artwork from the system 300 may comprise applying an image creation analysis algorithm configured to determine at least one time series of utensil track data based on the at least one time series of images, and identifying the at least one time series of utensil track data as the input stream of the data. The utensil track data may comprise one or more utensil track data items of a position of the smart utensil 330 (e.g. relating to the tip of the utensil), a direction of motion of the (smart) utensil, an orientation (e.g. an azimuthal angle, an altitude angle, an angle for rotation around the pen axis) of the (smart) utensil, a speed of motion of the (smart) utensil, an acceleration of motion of the (smart) utensil, a force acting on the (smart) utensil, and a mode of handling the (smart) utensil (e.g. how an artist holds the utensil), and a mode of use (e.g. on or off) of the (smart) utensil. Utensil track data items can be given in terms of the coordinate system or in coordinates for direction, orientation, speed, acceleration, and/or force derived therefrom. Furthermore, the utensil track data (or the time series of utensil actions capable of reproducing the visual artwork) may comprise a timestamp. The at least one time series of utensil track data may be equidistantly sampled with respect to time. In case of timestamps, obtaining 120 the input stream of the data recording the creation of the visual artwork from the system 300 may comprise applying a resampling algorithm configured to resample the time series of utensil track data based on an interpolation of the one or more utensil track data items between neighboring timestamps.

Identifying 130, based on the input stream of data 190, the at least one time series of utensil actions 191 capable of reproducing the visual artwork may comprise applying a utensil action identification algorithm configured to identify the at least one utensil action 195 in the input stream of data 190. Identifying the at least one utensil action 195 in the input stream may comprise gathering successive (w.r.t. a sampling of the time series) utensil track data in the time series of utensil track data until at least one utensil track data item substantially changes. In so doing, the at least one utensil action 195 can be defined. As an example, the at least one utensil track data item substantially changes, if a difference or an absolute difference of the at least one utensil track data item sampled at two successive sample points exceeds a first (predetermined or computed) threshold. The at least one utensil track data item can be a position of the (smart) utensil 330. Furthermore, identifying the at least one utensil action 195 in the input stream may comprise computing, based on the time series of utensil track data, at least one time series of derived quantity data. In this case, computing, based on the time series of utensil track data, the at least one time series of derived quantity data can be based on at least one feature of human writing, human drawing and/or human painting. The derived quantity data may comprise one or more derived quantity data items of a class (e.g. "mainly linear motion" or "dots") of what is drawn or painted and a magnitude of what is drawn or painted. Identifying the at least one utensil action 195 in the input stream may (then) comprises gathering successive (w.r.t. the sampling of the time series) derived quantity data in the time series of derived quantity data until at least one derived quantity data item substantially changes. In so doing, the at least one utensil action can be defined. As an example, the at least one derived quantity data item substantially changes, if a difference or an absolute difference of the at least one derived quantity data item sampled at two successive sample points exceeds a second (predetermined or computed) threshold.

In case of timestamps, identifying the at least one utensil action 195 in the input stream may comprise gathering successive utensil track data in the time series of utensil track data until the timestamp substantially changes. Such can be used in case the smart pen only records when in use. In so doing, the at least one utensil action can be defined. As an example, the timestamp substantially changes, if a difference or an absolute difference of the timestamp sampled at two successive sample points exceeds a third (predetermined or computed) threshold.

Obtaining 140 the at least one image 192 of the visual artwork may comprise applying an image capturing algorithm configured to prompt at least one user interaction via a user interface 360 of the system 300 guiding a user of the system to capture at least one image of the visual artwork. Alternatively, or in addition, the image capturing algorithm may be further configured to display the at least one captured image of the visual artwork via the user interface 360 comprising a graphical output 361. Alternatively, or in addition, the image capturing algorithm may be further configured to receive a confirmation indicating that the at least one image 192 is completed via the user interaction. In so doing, the at least one image of the visual artwork can be obtained. If needed, the aforementioned user interaction can be repeated. Alternatively (i.e. no image by camera needed), or in addition, obtaining 140 the at least one image 192 of the visual artwork may comprise applying an image capturing algorithm configured to reproduce the visual artwork based on the at least one time series of utensil actions 191, thereby obtaining the at least one image of the visual artwork (see optional arrow in FIG. 6 from 191 to 140). In case of an 3D object, it may be advantageous to obtain more than one images 192 of the visual artwork in order to capture various perspectives.

The method 100 may further comprise applying 160 (optional in FIG. 1a, FIG. 6) an artistic style algorithm configured to recognize at least one artistic style 196 for the at least one image 192 of the visual artwork. Here, the artistic style algorithm may comprise applying a first machine learning algorithm configured to and trained for artistic style recognition. As an example, the first machine learning algorithm may yield a classification result. In this case, it is trained on a training data set comprising examples and corresponding ground truth, thereby learning from data to generalize to unseen inputs. The artistic style algorithm can be configured to prompt at least one user interaction via a user interface 360 of the system 300 displaying the at least one recognized artistic style for the at least one image 192 of the visual artwork via the user interface 360, and to receive a confirmation indicating that the at least one recognized artistic style is correct or to receive an update for the at least one artistic style 196 via the user interaction, thereby recognizing the at least one artistic style. Alternatively, or in addition, the artistic style algorithm can be configured to prompt at least one user interaction via a user interface 360 of the system 300 to specify at least one artistic style 196 for the at least one image 192 of the visual artwork via the user interface 360, and to receive at least one specified artistic style via the user interaction, thereby recognizing (in a trivial sense) the at least one artistic style. This can be advantageous if the (expert) user is able to specify the artistic style.

The method 100 may further comprise applying 170 (optional in FIG. 1a, FIG. 6) an artwork meta data algorithm configured to recognize at least one item of artwork meta data 197 for the at least one image 192 of the visual artwork. Here, one or more items of artwork meta data 197 may comprise one or more of a difficulty level, timing, density of the at least one image 192, finesse of the at least one image, complexity of the at least one image, technique (e.g. "watercolor"), description of objects, keywords, and a comment. Furthermore, the artwork meta data algorithm may comprise applying a second machine learning algorithm configured to and trained for recognizing the one or more items of artwork meta data 197. Alternatively, or in addition, the artwork meta data algorithm may be configured to prompt at least one user interaction via a user interface 360 of the system 300 displaying the at least one recognized item of artwork meta data 197 for the at least one image 192 of the visual artwork via the user interface 360, and to receive a confirmation indicating that the at least one item of artwork meta data is correct or to receive an update for the at least one item of artwork meta data via the user interaction, thereby recognizing the at least one item of artwork meta data. Alternatively, or in addition, the artwork meta data algorithm is configured to prompt at least one user interaction via a user interface 360 of the system 300 to specify at least one item of artwork meta data 197 for the at least one image 192 of the visual artwork via the user interface 360, and to receive at least one specified item of artwork meta data for the at least one image via the user interaction, thereby recognizing the at least one item of artwork meta data.

Generating 150 the action-to-feature mapping 193 based on the at least one time series of utensil actions 191 and on the at least one image 192 of the visual artwork may comprise applying an action-to-feature algorithm configured to recognize at least one artistic feature 194 of the visual artwork or of the at least one image of the visual artwork. The action-to-feature algorithm may comprise applying at least one computer vision algorithm (e.g. consisting of or comprising at least one third machine learning algorithm) configured to recognize the at least one artistic feature 194 of the visual artwork or of the at least one image 192 of the visual artwork. The at least one artistic feature 194 comprises one or more of a dot, a cluster of dots, a line segment, an edge, an angle, a straight or curved line, a stroke, a brush, and/or a layer. Alternatively, or in addition, the at least one artistic feature may be defined by a feature that (significantly) contributes to a particular artistic style. Recognizing the at least one artistic feature 194 of the visual artwork or of the at least one image 192 of the visual artwork may comprise computing at least one artistic feature position (e.g. an average position, start position and/or end position, e.g. in terms of the coordinate system) of the at least one artistic feature. The action-to-feature algorithm is further configured to identify at least one utensil action 195 of the time series of utensil actions 191 for each artistic feature 194, thereby generating the action-to-feature mapping 193 comprising one or more pairs (or an n-tuple, i.e. a list), wherein each pair (n-tuple/list) comprises at least one utensil action of the at least one time series of utensil actions and the at least one artistic feature recognized for the utensil action. Identifying the at least one utensil action 195 of the time series of utensil actions 191 for each artistic feature 194 can be based (e.g. by matching positions using average positions of extended objects) on the at least one artistic feature position and on a utensil track data item comprising a position of the smart utensil 330. In case of utensil track data items and timestamps, identifying the at least one utensil action 195 of the time series of utensil actions 191 for each artistic feature 194 can be based on the utensil track data, optionally on one or more utensil track data items, and/or the timestamp. In case of derived quantity data, identifying the at least one utensil action 195 of the time series of utensil actions 191 for each artistic feature 194 can be based on the at least one time series of derived quantity data.

Figure 3:
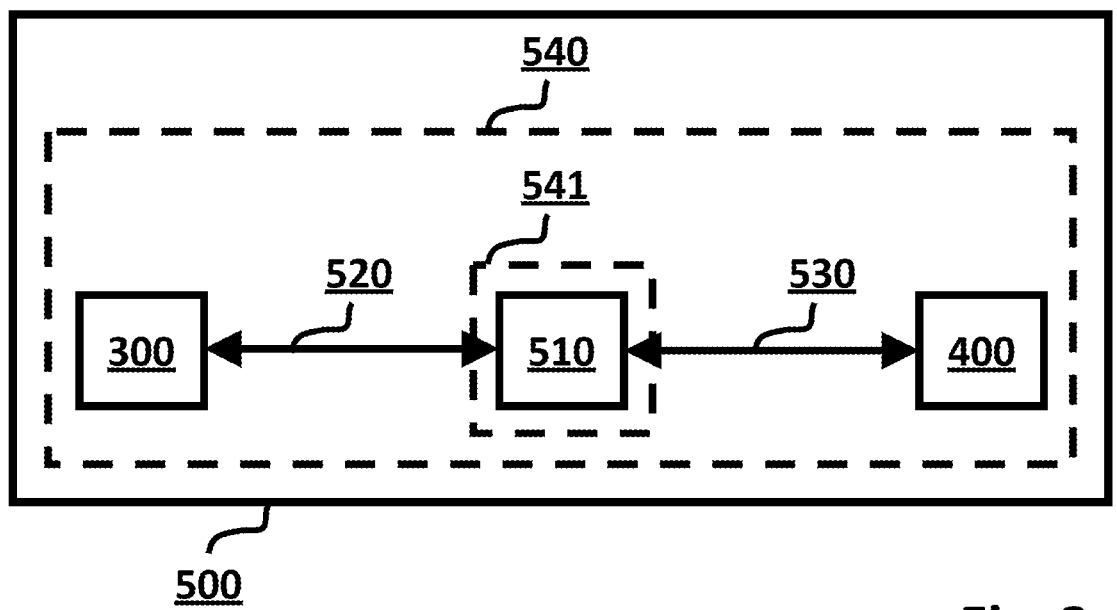
FIG. 3 illustrates an example distributed visual artwork system according to the fifth aspect.

In an embodiment, see FIG. 3 and FIG. 6, the method 100 may comprise storing 180 (optional in FIG. 1*a*) one or more of the action-to-feature mapping 193, the at least one artistic feature 194, the at least one artistic style 196 of the at least one image of the visual artwork, the at least one image 192 of the visual artwork 10, the artwork meta data 197, and the at least one time series of utensil actions 191 in an artistic style database 510 (e.g. in a machine-readable format). Preferably, the action-to-feature mapping 193 is stored in the artistic style database 510. Alternatively, or in addition, the at least one artistic feature 194 is stored in the artistic style database 510. Alternatively, or in addition, the at least one artistic style 196 is stored in the artistic style database 510. Alternatively, or in addition, the at least one image 192 of the visual artwork 10 is stored in the artistic style database 510. Alternatively, or in addition the artwork meta data 197 is stored in the artistic style database 510.

Figure 1B:
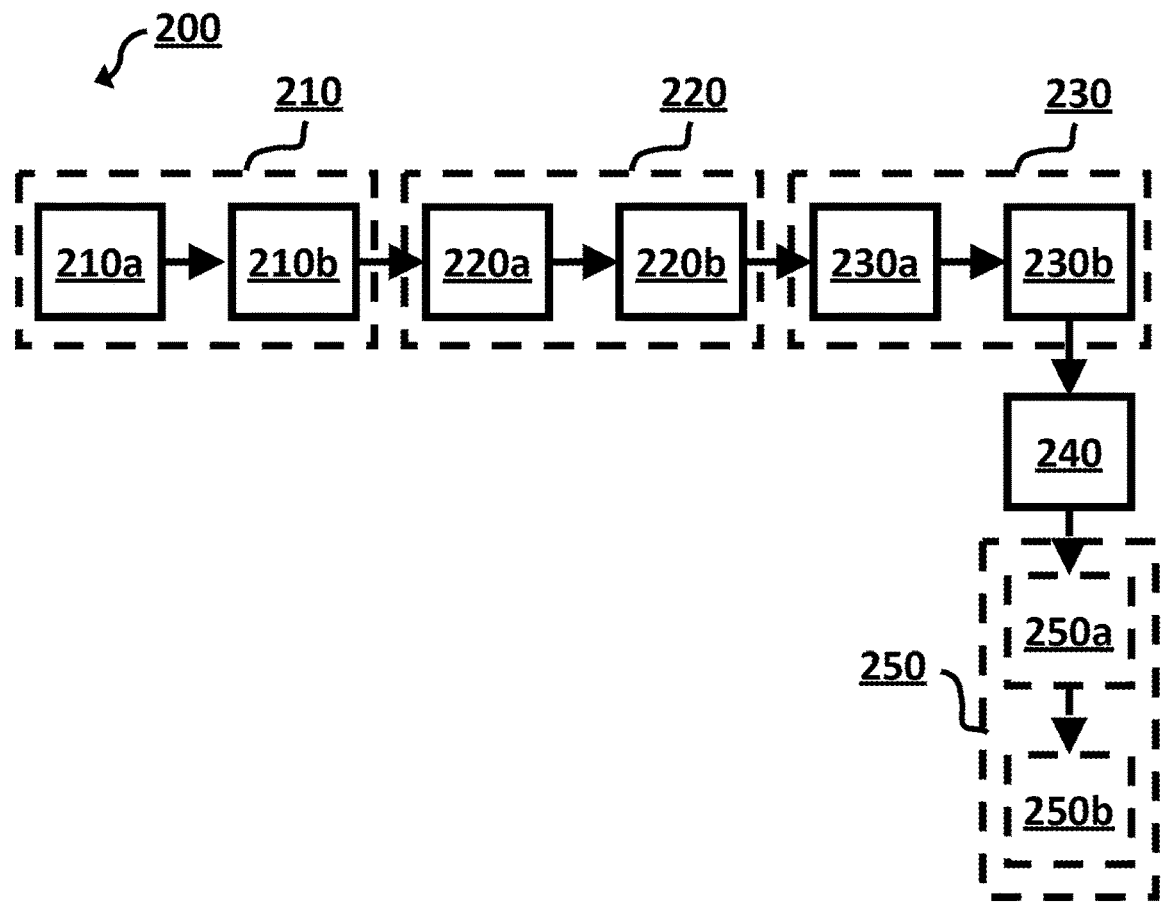

FIG. 1*b* schematically illustrates the computer-implemented method according to the second aspect for generating and running a creative tutorial algorithm for creating a visual artwork. The computer-implemented method 200 for generating and running a creative tutorial algorithm 266 for creating a visual artwork 10 comprises obtaining 210*a* data 260 defining a creative objective 261 and identifying 210, 210*b* the creative objective 261 based on the data 260 defining the creative objective, as shown in FIG. 6. Running the generated creative tutorial algorithm yields the creative tutorial. The method 200 further comprises obtaining 220*a* information 262 about at least one targeted artistic style 263 and identifying 220, 220*b* the at least one targeted artistic style 263 based on the information 262 about the at least one targeted artistic style. The order of steps 210 and 220 can be irrelevant, i.e. step 220 can precede step 210. The method 200 further comprises accessing 230*a* a plurality of predetermined artistic styles 264 and identifying 230, 230*b*, based on the plurality of predetermined artistic styles 264, at least one predetermined artistic style 196 matching the at least one targeted artistic style 263, thereby specifying at least one targeted predetermined artistic style 265. The method 200 further comprises generating 240 the creative tutorial algorithm 266. The creative tutorial algorithm 266 is configured to comprise one or more instructions 267 on how to reproduce the creative objective 261 in terms of the at least one targeted predetermined artistic style 265. The one or more instructions may be calibrated based on the (tutorial) user, e.g. based on his skill level and/or age.

As an example, the plurality of predetermined artistic styles 264 is provided by one or more (expert) users by means of the method according to the first aspect. Predetermined artistic styles 264 can be stored in the system 400 the (tutorial) user creates the visual artwork in. Alternatively, or in addition, they may be accessed (online) in the distributed visual artwork system 500. The latter is advantageous in that predetermined artistic styles can be added after shipping the system 400 for generating and running the creative tutorial algorithm for a visual artwork.

The creative objective is what a (tutorial) user aims to create. The creative objective 261 may comprise or be a (digital) image, optionally a photo. As an example, the image may show a scene, one or more objects, or another visual artwork (for copying). The targeted artistic style is an artistic style (e.g. impressionism, or by reference to an (expert) user, or by description, . . . ) the (tutorial) user aims to create the creative objective in. Data 260 defining the creative objective 261 may comprise an input image (e.g. an input photo). In this case, obtaining 210*a* the data 260 defining the creative objective 261 and identifying 210*b* the creative objective based on the data defining the creative objective may comprise applying the input image (e.g. the input photo) to an image correction algorithm configured to recognize (if present) at least one deficiency of the image, and to compute at least one correction to the at least one deficiency of the image, to prompt a user interaction via a user interface 460 of a system 400 displaying the image and the at least one correction of the image, and to receive (such a user input can be seen as another datum comprised by the data 260) the at least one correction by a selection of the one or more corrections of the image via the user interaction, thereby modifying the input image, optionally the input photo, based on the selection. Alternatively, the input image can automatically be modified. As an example, a deficiency may comprise one or more of perspective distortion, image misalignment, flashlight reflection, background artifacts, and color imbalance. Distortions and/or misalignments may be remedied by image warping. Alternatively, or in addition, obtaining 210*a* the data 260 defining the creative objective 261 and identifying 210*b* the creative objective based on the data defining the creative objective may comprise applying the input image, optionally the input photo, to a feature extraction algorithm configured to recognize and/or classify at least one feature (e.g. an object or a face of a person) of the image, and to prompt a user interaction via a user interface 460 of the system 400 displaying the image and highlighting one or more features in the image, and to receive (such a user input can be seen as another datum comprised by the data 260) at least one feature by a selection of the one or more features in the image via the user interaction, thereby modifying the input image, optionally the input photo, based on the selection. Alternatively, feature extraction can be automated. Furthermore, obtaining 210*a* the data 260 defining the creative objective 261 and identifying 210b the creative objective based on the data defining the creative objective may comprise converting the creative objective to a vector graphics, thereby modifying the input image, optionally the input photo. In contrast to bitmaps, a vector graphics has benign scaling properties. When applying an artistic feature from an (expert) user scaling the input photo and/or the artistic feature may be required. Identifying 210b the creative objective 261 based on the data 260 defining the creative objective may comprise identifying the input image, optionally the input photo, as the creative objective. Put differently, in this case the image is the input image.

The information 262 about the at least one targeted artistic style 263 may comprise a reference image. It is not essential that the at least one targeted artistic style 263 can be named in a specific way (e.g. impressionism, "artist John Doe", . . . ). Instead, whatever its name, it is important to have corresponding data (e.g. the action-to-feature mapping 193) to apply the artistic style on the creative objective. As an example, the reference image may comprise or be a reference painting (or an image thereof). As another example, the reference image may comprise or be a reference drawing (or an image thereof). The reference image may comprise a plurality of images for a 3D object. Identifying 220b the at least one targeted artistic style based on the information 262 about the at least one targeted artistic style 263 may comprise applying an artistic style extraction algorithm configured to recognize at least one (or exactly one) artistic style of the reference image, thereby identifying the at least one targeted artistic style. The artistic style extraction algorithm may employ known image analysis techniques such as e.g. style recognition, pattern recognition and matching in determining the artistic style. Alternatively, or in addition, obtaining 220a the information 262 about the at least one targeted artistic style 263 and identifying 220b the at least one targeted artistic style 263 based on the information 262 about the at least one targeted artistic style may comprise applying an artistic style extraction algorithm configured to recognize at least one artistic style of the reference image, to prompt a user interaction via a user interface 460 of the system 400 displaying one or more recognized artistic styles of the reference image, and to receive (such a user input can be seen as another datum comprised by the information 262) the at least one artistic style by a selection of the one or more possible recognized artistic styles via the user interaction, thereby identifying the at least one targeted artistic style. As an example, applying the artistic style extraction algorithm may comprise applying a machine learning algorithm trained and configured for artistic style recognition. Alternatively, or in addition applying the artistic style extraction algorithm may comprise querying a database. This database may or may not be the artistic style database 510. Alternatively, or in addition, obtaining 220a the information 262 about the at least one targeted artistic style 263 and identifying 220b the at least one targeted artistic style 263 based on the information 262 about the at least one targeted artistic style comprises applying an artistic style input algorithm configured to suggest at least one artistic style (e.g. from a list of predetermined artistic styles), and to prompt a user interaction via a user interface 460 of the system 400 displaying one or more suggested artistic styles, and to receive (such a user input can be seen as another datum comprised by the information 262) the at least one artistic style by a selection of the one or more suggested artistic styles via the user interaction, thereby identifying the at least one targeted artistic style. Alternatively, or in addition, the artistic style input algorithm may allow the (tutorial) user to search and find an artistic style.

The information 262 about the at least one targeted artistic style 263 may comprise at least one reference artistic style (e.g. in a machine-readable format). In this case, obtaining 220a the information 262 about the at least one targeted artistic style 263 and identifying 220b the at least one targeted artistic style based on the information about the at least one targeted artistic style may comprise identifying the at least one reference artistic style as the at least one targeted artistic style. Furthermore, identifying 220b the at least one targeted artistic style based on the information 262 about the at least one targeted artistic style 263 may comprise converting the at least one targeted artistic style to a machine-readable format, optionally wherein the machine-readable format is compatible with a storage format of further artistic styles stored in an artistic style database 510.

Identifying 230b, based on the plurality of predetermined artistic styles, the at least one predetermined artistic style 196 matching the at least one targeted artistic style may comprise applying an artistic style matching algorithm configured to compare the at least one targeted artistic style to at least one predetermined artistic style 196 of the plurality of predetermined artistic styles, and to identify the at least one predetermined artistic style 196 based on comparing the at least one targeted artistic style to at least one predetermined artistic style 196 of the plurality of predetermined artistic styles. Here, comparing the at least one targeted artistic style to the at least one predetermined artistic style 196 of the plurality of predetermined artistic styles 264 may yield a score quantifying a congruence between the at least one targeted artistic style and the at least one predetermined artistic style 196 of the plurality of predetermined artistic styles 264. The at least one predetermined artistic style 196 can be identified based on a predetermined criterion (e.g. a condition with a threshold), optionally, comprising the score. Alternatively, or in addition, the artistic style matching algorithm may be further configured to prompt a user interaction via a user interface 460 of the system 400 displaying one or more identified predetermined artistic styles, and to receive the at least one predetermined artistic style by a selection of the one or more possible identified artistic styles via the user interaction, thereby identifying the at least one predetermined artistic style. Here, displaying the one or more identified predetermined artistic styles may comprise e.g. also displaying meta information such as price, skill level, tools available and/or other attributes (rating, date, . . . ) or a preview of the tutorial (e.g. the ideal output image 270) to be generated. Furthermore, the one or more possible identified artistic styles can be filtered and/or ranked based on a predetermined criterion (e.g. based on the meta information), and optionally according to the user interaction.

In an embodiment, accessing 230a the plurality of predetermined artistic styles 264 may comprise querying an artistic style database 510, preferably generated (or filled) using the method 100 according to an embodiment (embodiment 50) of the first aspect.

The at least one identified predetermined artistic style can be identified 230b as the at least one targeted predetermined artistic style 265.

Generating 240 the creative tutorial algorithm 266 may comprise generating an ideal output image 270, see FIG. 5c, FIG. 6, (digitally) reproducing the creative objective 261 in terms of the at least one targeted predetermined artistic style 265. Generating the ideal output image 270 may comprise querying at least one artistic feature 194 stored for the at least one targeted predetermined artistic style 265 in an artistic style database 510 and queried therefrom, and integrating the at least one artistic feature in the ideal output image 270.

Alternatively, or in addition, generating the ideal output image 270 comprises querying a predetermined image 192 corresponding to and representing the at least one targeted predetermined artistic style 265 from an artistic style database 510, and extracting from the predetermined image at least one artistic feature 194, and integrating the at least one artistic feature in the ideal output image 270.

Alternatively, the ideal output image 270 may be identified with the predetermined image 192 if a similarity criterion comparing the predetermined image to the creative objective 261 is satisfied. Tools for comparing images are state of the art.

Generating 240 the creative tutorial algorithm 266 may comprise generating the one or more instructions 267 on how to reproduce the creative objective 261 in terms of the at least one targeted predetermined artistic style 265. In this case, generating the one or more instructions 267 can be based on analyzing the ideal output image 270. Furthermore, generating the one or more instructions 267 can be based on how the ideal output image 270 is generated. As an example, it is possible to keep track of the steps and their order while generating the ideal output image 270.

Generating 240 the creative tutorial algorithm 266 may comprise accessing data stored in the artistic style database 510, as shown in FIG. 6.

In an embodiment, generating the one or more instructions 267 may comprise applying an action-to-feature mapping 193 stored for the at least one targeted predetermined artistic style 265 in the artistic style database 510 and queried therefrom to find at least one utensil action 195 for the at least one artistic feature 194.

In case of identifying the ideal output image with the predetermined image, generating the one or more instructions 267 may comprise querying at least one predetermined time series of utensil actions 191 capable of reproducing the predetermined image 192 from the artistic style database 510, and deriving the one or more instructions 267 based on the at least one predetermined time series of utensil actions 191. Deriving the one or more instructions 267 can be trivial.

An instruction 267 may detail at least one utensil action of creating the visual artwork. A utensil action can be any action (e.g. a stroke, a scrape, . . . ) that can be performed with the utensil (which may be one or more hands of the user). As examples, the at least one utensil action describes how to draw, paint, or create a dot, a line segment, a straight or curved line, a stroke, a brush, and/or a layer (e.g. an area (fictitiously) bounded by a closed (polygonal and/or curved) line) the ideal output image 270 is made of. Here, the description may comprise one or more of a specification as to which utensil is to be used, a specification of the color or tone, a specification of the position and/or the direction, a specification as to how much pressure to apply on the utensil, and a specification as to how fast to move the utensil. Furthermore, a coordinate system relating to a plane (or a space) the visual artwork is to be created in can be defined. When creating a 3D object, an instruction 267 may comprise views from various angles (e.g. via 3D rendering). Furthermore, the user interface 460 may allow the user to change such angles as required. Such is advantageous for resolving ambiguities when representing a 3D object in a 2D plane. The at least one utensil action can also be animated in a video sequence. The one or more instructions 267 can be grouped into at least one group of instructions.

As an example, a line can be broken into two or more line segments. Alternatively, or in addition, the one or more instructions 267 can be organized into a hierarchy of groups or nested groups. Alternatively, or in addition, an order of the one or more instructions 267 is computed. In an embodiment, the order can be computed so as to avoid a succession of instructions 267 conflicting with each other in creating the artwork. This can be advantageous e.g. in order to prevent smudging of watercolors. Alternatively, or in addition, computing the order of the one or more instructions 267 may comprise querying the predetermined order of the one or more predetermined instructions from the artistic style database 510 and identifying the predetermined order as the order.

The method 200 may further comprise running (i.e. execute) 250*a* and/or outputting 250, 250*b* (optional in FIG. 1*b*) the creative tutorial algorithm 266. This enables the (tutorial) user to use the creative tutorial. The creative tutorial algorithm 266 may be further configured to display one of the one or more instructions 267, when the one of the one or more instructions is due as creating the artwork progresses, thereby determining a current instruction 268, see FIG. 5*c*. In case, an order of instructions is computed, the creative tutorial algorithm 266 may be further configured to prompt a user interaction via a user interface 460 of the system 400, and to receive a confirmation (e.g. via an audio signal or button, in case the user interface is equipped with either a microphone or the button) indicating that the current instruction 268 is completed, and to determine a next instruction 269 subsequent to the current instruction 268 according to the order of the one or more instructions, thereby determining the next instruction 269 as being due. Alternatively, or in addition, outputting 250*b* the creative tutorial algorithm 266 may comprise displaying the one or more instructions 267 according to the order of the one or more instructions, optionally in terms of a list of instructions. Here, prompting the user interaction may comprise displaying the current instruction 268 (e.g. instead of a/the previous instruction), and displaying a progressive list of instructions extended by the current instruction 268 as creating the artwork progresses. Alternatively, or in addition, prompting the user interaction may comprise generating an audio signal encompassing verbal content of the current instruction 268, and playing this audio signal via at least one speaker of the user interface 460 of the system 400. Alternatively, or in addition, prompting the user interaction may comprise generating a current haptic algorithm for a haptic feedback device 463 of a smart utensil 430 encoding the current instruction 268, and transmitting the current haptic algorithm to the haptic feedback device 463 via the user interface 460 of the system 400, and executing the current haptic algorithm on the haptic feedback device 463.

The creative tutorial algorithm 266 may be further configured to display the creative objective 261 on a graphical user interface 461 of the system 400. Furthermore, the creative tutorial algorithm 266 may be further configured to display the ideal output image 270 (if generated) on a graphical user interface 461. In this case, alternatively, or in addition, the ideal output image 270 is displayed as the one or more constructions progress. This is advantageous as the (tutorial) user can compare her or his visual artwork to the progressing ideal output image 270 during the creation of the visual artwork. Such immediate feedback is helpful to spot and correct mistakes as they occur. Alternatively, or in addition, the creative tutorial algorithm 266 can be further configured to display the predetermined image 192 (if queried) on a graphical user interface 461. In this case, the current instruction 268 can be exemplified in displaying a corresponding step in the predetermined image 192.

FIG. 6 shows an example embodiment of the computer-implemented method 100 according to the first aspect linked to the computer-implemented method 200 according to the second aspect via an artistic style database 510.

The system 300 for generating an action-to-feature mapping 193 of the visual artwork 10 is configured to run the computer-implemented method 100 of the first aspect (or an embodiment thereof) for generating the action-to-feature mapping 193 of a visual artwork.

The system 400 for generating and running a creative tutorial algorithm 266 for a visual artwork 10 is configured to run the computer-implemented method 200 of the second aspect (or an embodiment thereof) for generating and running a creative tutorial algorithm 266 for creating a visual artwork.

The system 300 and the system 400 may or may not be identical in terms of their architecture. Put differently, the system 300, 400 may be used by both an (expert) user applying the method 100 of the first aspect and an (tutorial) user applying the method 200 of the second aspect. The system 300, 400 may be equipped with one or more processors, memory, and optionally storage 510.

Figure 2A:
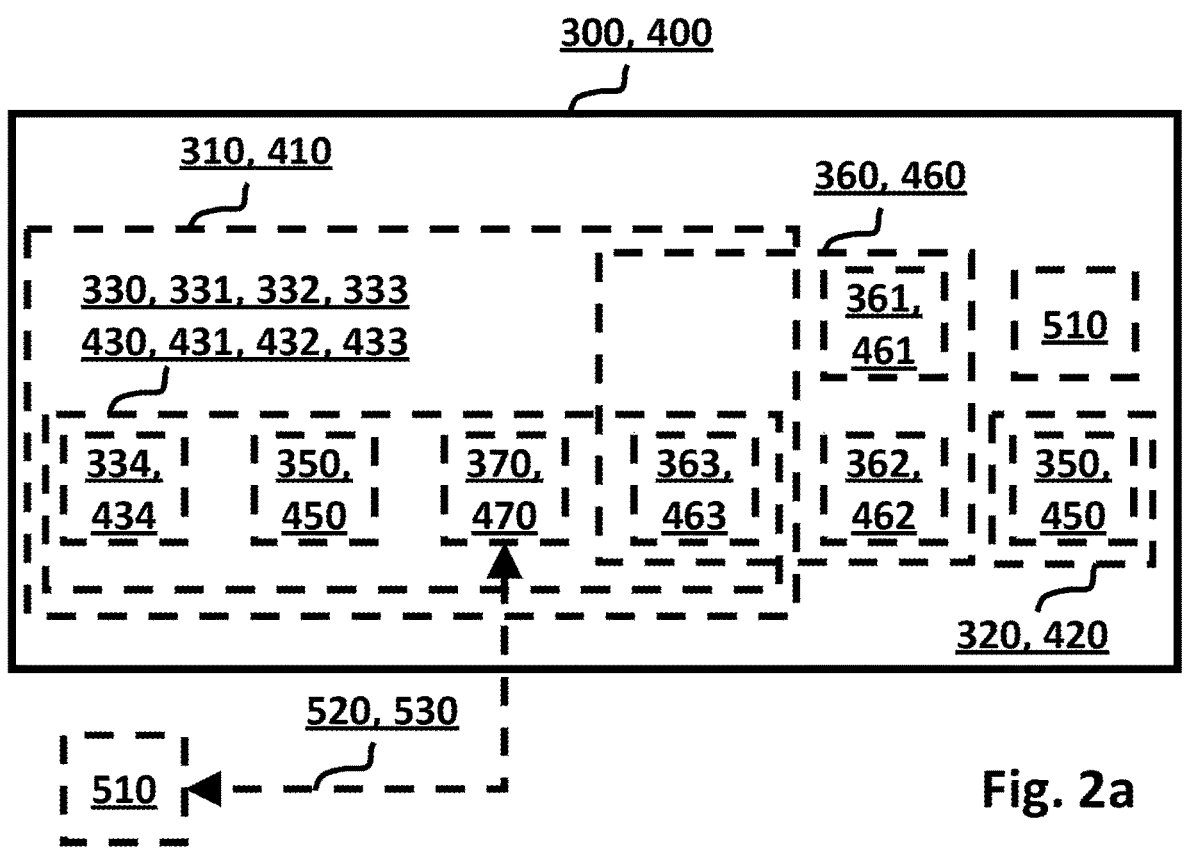
Figure 4A:
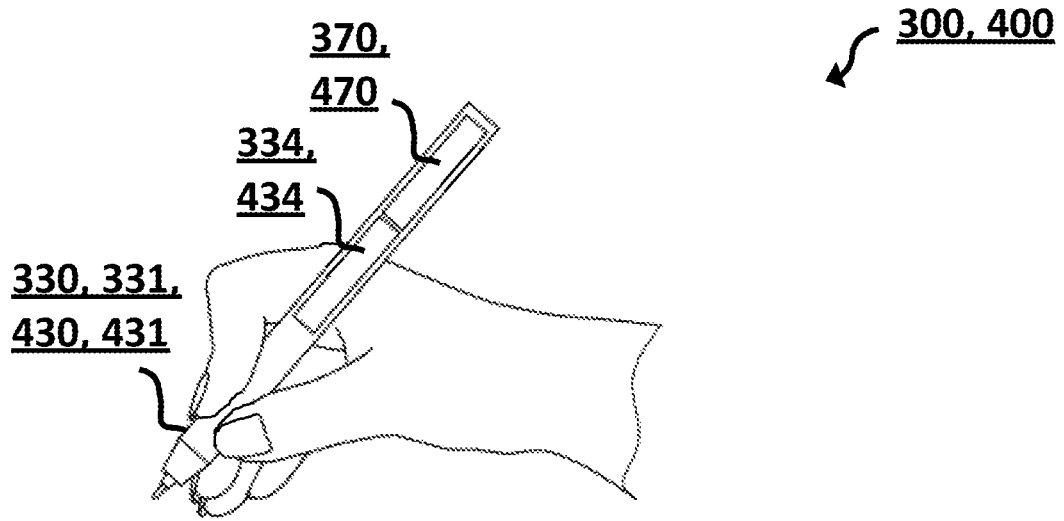
FIG. 4a illustrates an example system according to the third aspect and/or according to the fourth aspect, comprising a smart utensil.

FIG. 2a schematically illustrates an example system according to the third aspect for generating an action-to-feature mapping of a visual artwork and/or according to the fourth aspect for generating and running a creative tutorial algorithm for a visual artwork, comprising a smart utensil 330, 430. The system 300, 400 may comprise an artwork subsystem 310, 410 configured to capture at least one action in creating the visual artwork, and optionally, an image capturing subsystem 320, 420 configured to capture at least one image of the artwork. In this case, the artwork subsystem 310, 410 may comprise the smart utensil 330, 430, see FIG. 4a. The smart utensil 330, 430 may comprise a smart pen 331, 431, a smart brush 332, 432, and/or a smart wrist device 333, 433. A smart wrist device 333, 433 can be useful for tracking actions for a 3D object. Furthermore, the smart utensil 330, 430 may comprise at least one sensor 334, 434 configured to capture utensil track data of the smart utensil, see FIG. 2a, FIG. 4a. Here, the smart utensil 330, 430, optionally the at least one sensor 334, 434, may comprise one or more of an accelerometer, a gyroscope, a magnetometer, and a force sensor. In one embodiment, one or more sensors may be used to identify motion data of the at least one smart utensil. For example, a pen may include a sensor that transmits the motion of the pen (e.g., using a motion sensor, a camera, etc.). As another example, a surface used to write may include one or more sensors (e.g., force sensor, haptic sensor, touch sensor, etc.) configured to detect motion data of the at least one smart utensil.

Figure 2B:
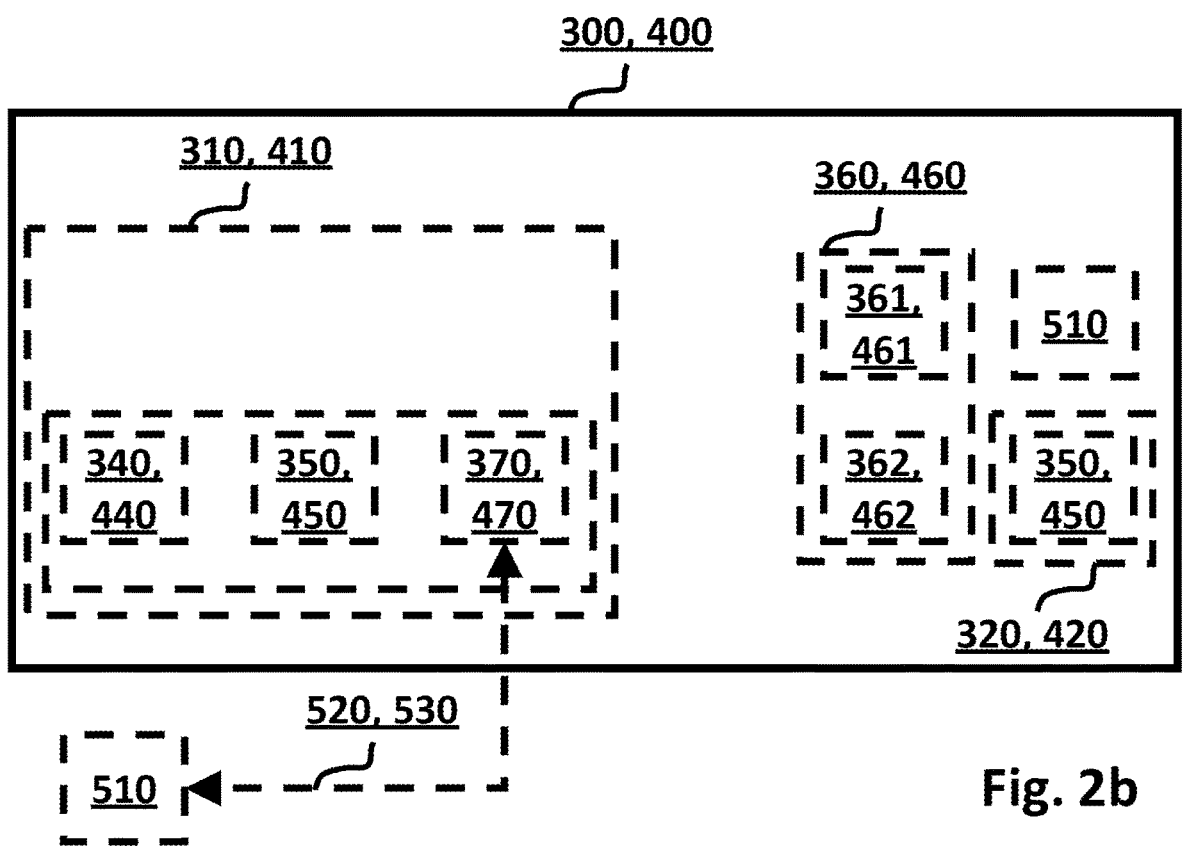

FIG. 2b schematically illustrates an example system according to the third aspect and/or according to the fourth aspect, comprising a pen, a ballpoint pen, a fountain pen, a felt-tip pen, a pencil, a digital pen, a brush (e.g. a paint brush), a knife, a spatula, a palette knife, or a chisel (to be used when modeling a 3d object). The system 300, 400 may comprise an artwork subsystem 310, 410 configured to capture at least one action in creating the visual artwork, and optionally, an image capturing subsystem 320, 420 configured to capture at least one image of the artwork. In this case, the artwork subsystem 310, 410 may comprise a pen, a ballpoint pen, a fountain pen, a felt-tip pen, a pencil, a digital pen, a brush, a knife, a spatula, a palette knife, or a chisel 340, 440.

Figure 4B:
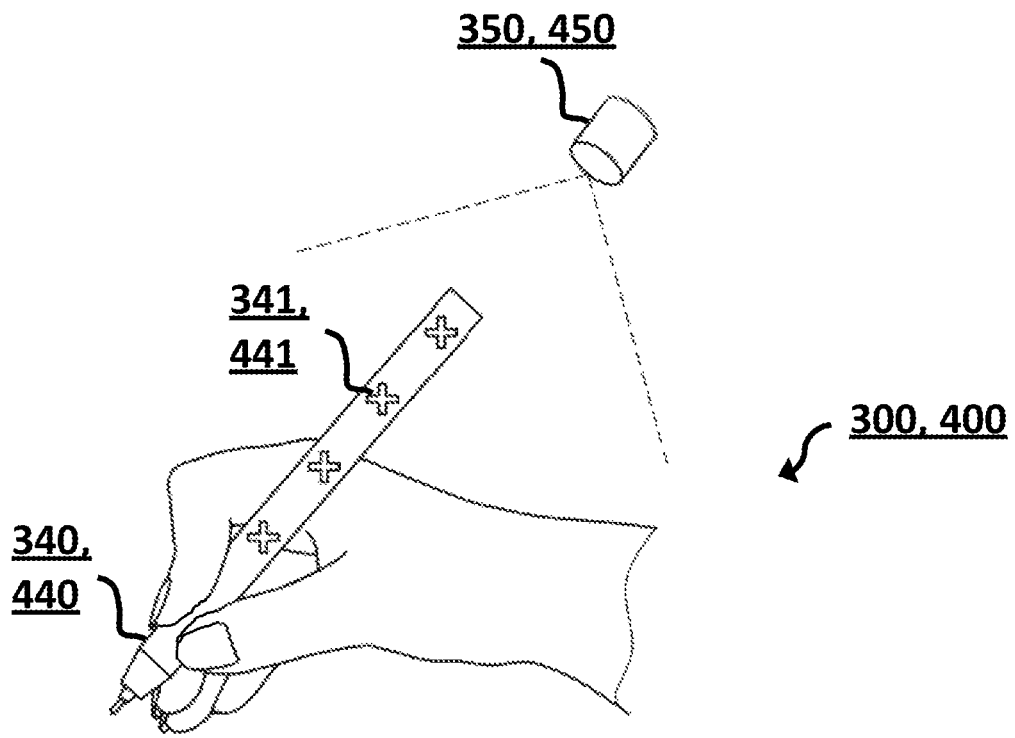
FIG. 4b illustrates an example system according to the third aspect and/or according to the fourth aspect, comprising a pen.
Figure 5A:
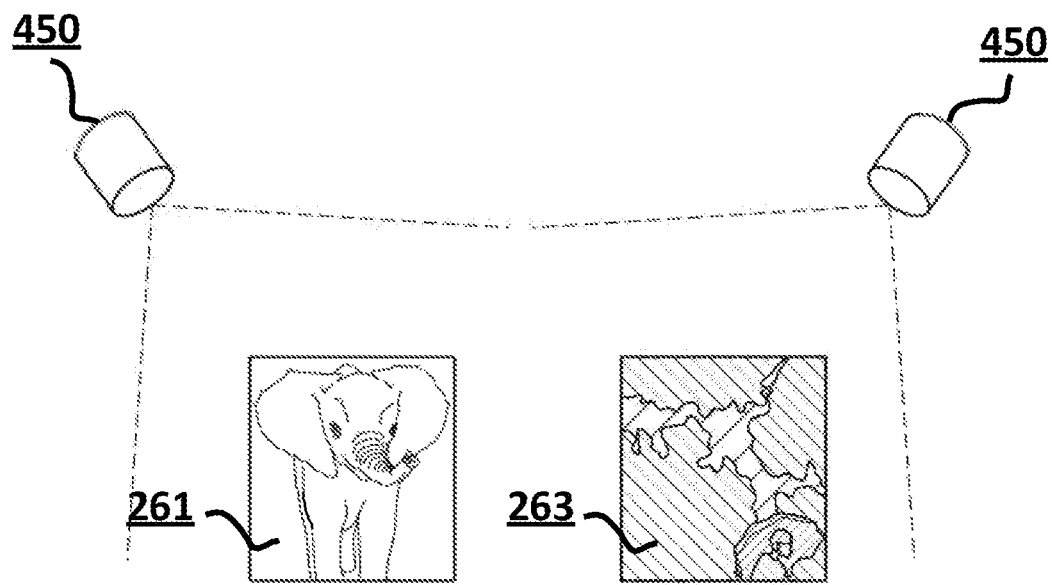
FIG. 5a illustrates another example system according to the third aspect and/or according to the fourth aspect, comprising a camera.
Figure 5B:
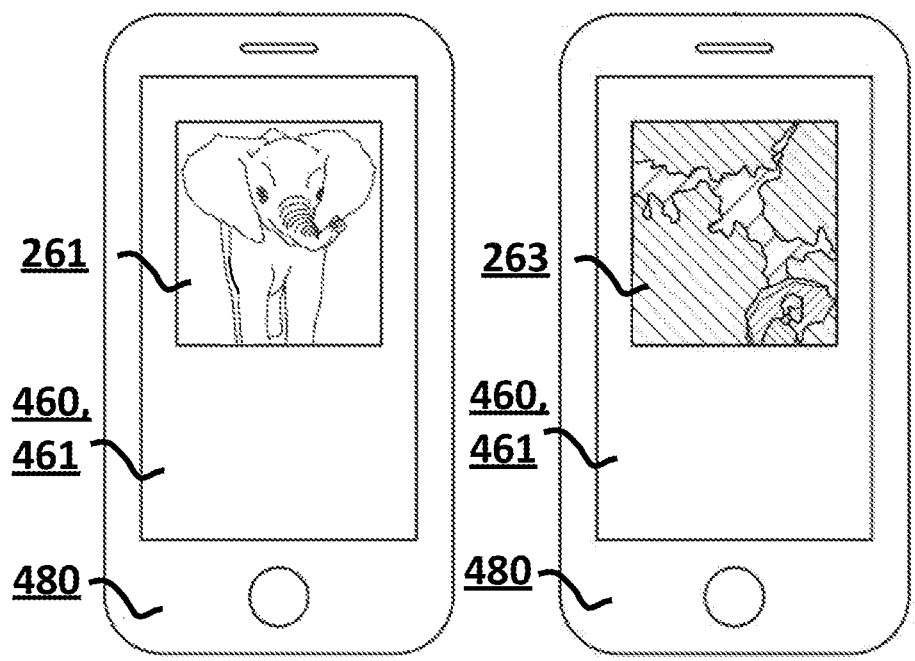
FIG. 5b illustrates another example system according to the third aspect and/or according to the fourth aspect, comprising a smartphone.
Figure 5C:
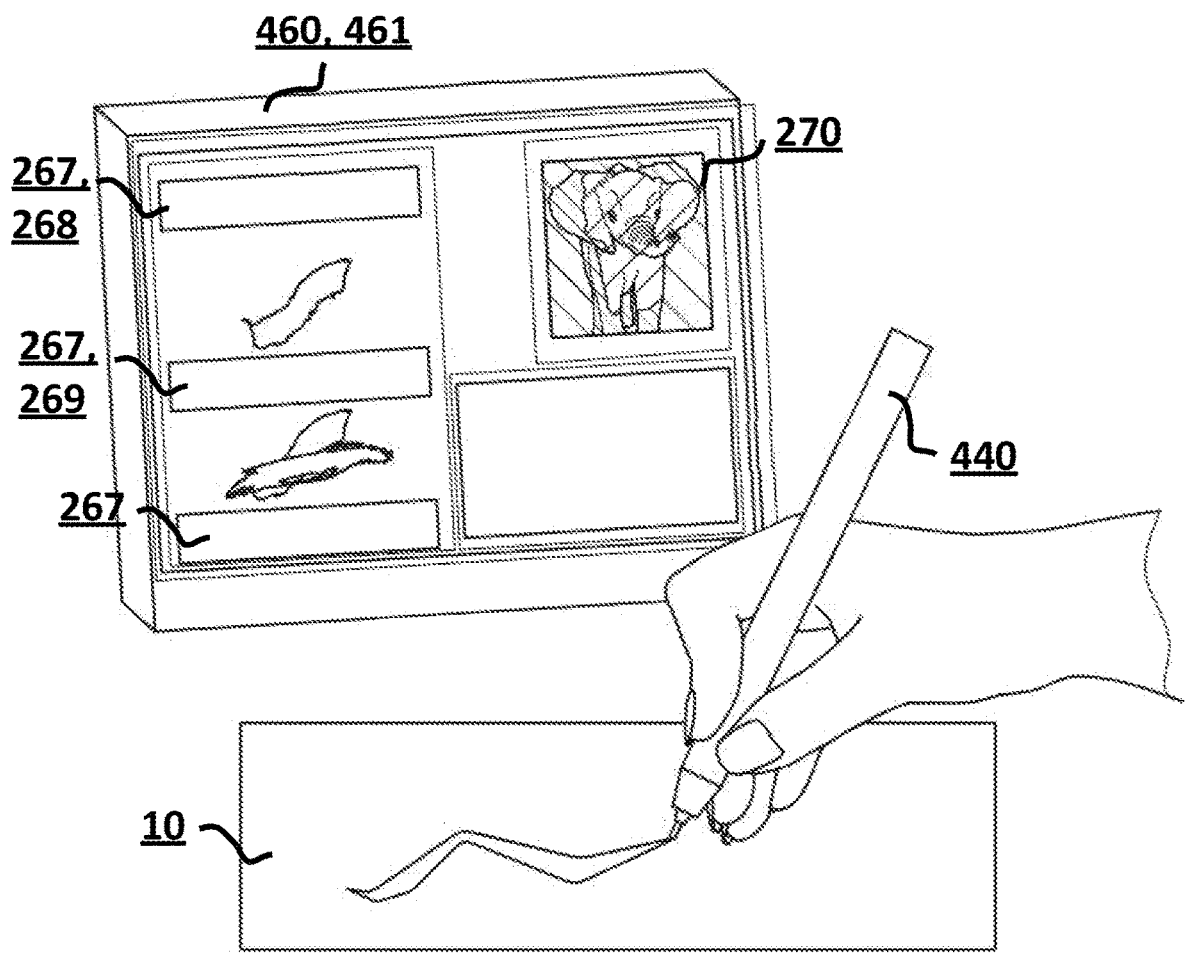
FIG. 5c illustrates another example system according to the third aspect, comprising a user interface and a graphical output and running a creative tutorial algorithm.

As displayed in FIG. 2a-b, FIG. 5a, the artwork subsystem 310, 410 may comprise at least one camera 350, 450 configured to track the motion of the smart utensil 330, 430, the pen, the ballpoint pen, the fountain pen, the felt-tip pen, the pencil, the digital pen, the brush, the knife, the spatula, the palette knife, or the chisel 340, 440, optionally wherein the pen, the ballpoint pen, the fountain pen, the felt-tip pen, the pencil, the digital pen, the brush, the knife, the spatula, the palette knife, or the chisel comprises a visual tracking feature 341, 441 as display in FIG. 4b. Alternatively, or in addition, the image capturing subsystem 320, 420 may comprise at least one camera 350, 450, see FIG. 2a-b. The at least one camera 350, 450 can be a camera of a smartphone 380, 480, as display in FIG. 5b. Alternatively, or in addition, the at least one camera 350, 450 can be mounted on the smart utensil 330, 430, the pen, the ballpoint pen, the fountain pen, the felt-tip pen, the pencil, the digital pen, the brush, the knife, the spatula, the palette knife, or the chisel 340, 440.

The system can further be configured to run an image correction algorithm on at least one image of the artwork captured by the image capturing subsystem 320, 420.

The system 300, 400, optionally the artwork subsystem, may comprise at least one communication module 370, 470 configured to communicate with the at least one artistic style database 510 via a data channel 520, 530 (optionally indirectly via the processor of the system 300, 400). Alternatively, the at least one artistic style database 510 can be part of the system 300, 400, see FIG. 2a-b.

The system 300, 400 may further comprise at least one user interface 360, 460, see FIG. 2a-b. Furthermore, the at least one user interface 360, 460 may comprise a graphical output 361, 461, see e.g. FIG. 5b-c. Alternatively, or in addition, the at least one user interface 360, 460 may comprise an audio speaker 362, 462. This can be advantageous for a (smart) utensil without a graphical output 361, 461. The audio speaker may or may not be integrated in the (smart) utensil. In case of the smart utensil, the at least one user interface 360, 460 may comprise a haptic feedback device 363, 463 on the smart utensil 330, 430. This can be advantageous to directly guide and instruct the (tutorial) user.

FIG. 3 illustrates an example distributed visual artwork system according to the fifth aspect. 127. The distributed visual artwork system 500 comprises at least one first system 300 of the third aspect (or an embodiment thereof) for generating an action-to-feature mapping 193 of a visual artwork and at least one second system 400 of the fourth aspect (or an embodiment thereof) for generating and running a creative tutorial algorithm 266 for a visual artwork. The distributed visual artwork system 500 further comprises at least one artistic style database 510. The at least one first system is configured to communicate with the at least one artistic style database 510 via a first data channel 520, and the at least one second system is configured to communicate with the at least one artistic style database 510 via a second data channel 530.

The at least one first system 300 may comprise the at least one second system 400. Alternatively, or in addition, the at least one second system 400 may comprise the at least one first system 300. Put differently, the first system 300 may be identical to the second system 400. Furthermore, the first data channel 520 and/or second data channel 530 may comprise (or realized in) one or more of a network, internet, a local area network, a wireless local area network, a broadband cellular network (e.g. 4G, 5G, 6G), and a wired network 540. Preferably, the first data channel 520 and/or second data channel 530 are realized via internet (possibly via a broadband cellular network). This is advantageous for setting up a large network of expert users and tutorial users and for gathering data in the artistic style database 510. As an example, the at least one artistic style database 510 may be hosted on a server 541.

Figure 7:
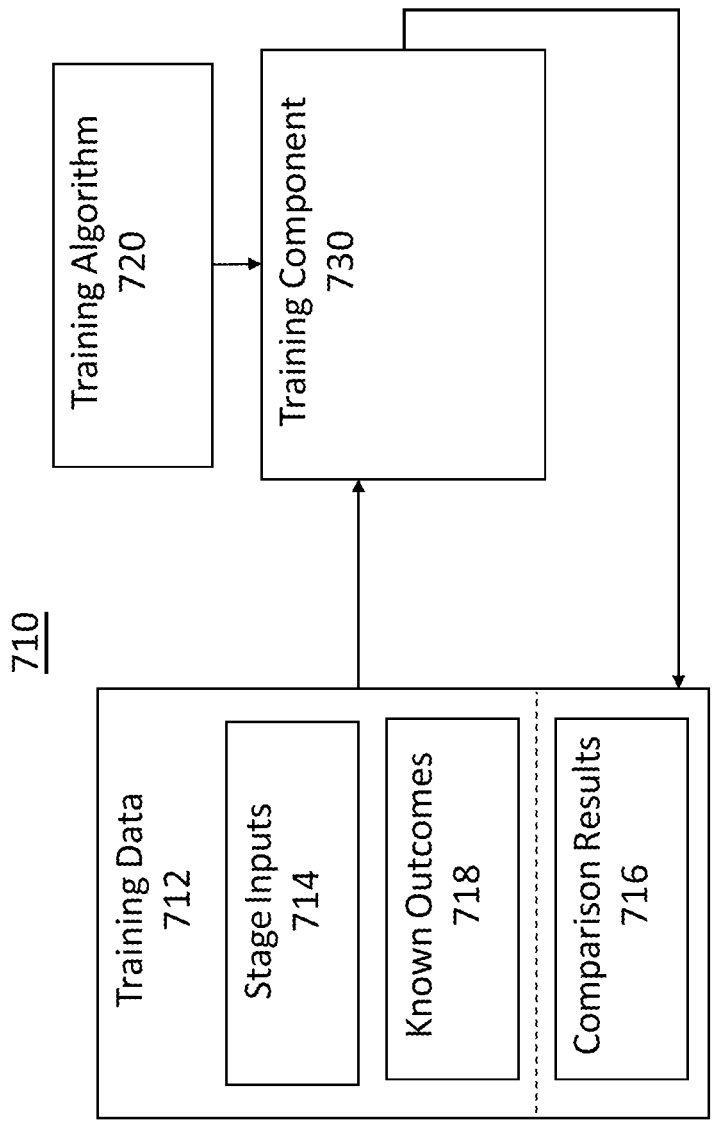
FIG. 7 shows an example machine learning training flow chart.

One or more implementations disclosed herein include and/or may be implemented using a machine learning model. For example, one or more of the creative tutorial algorithm, initialization algorithm, image creation analysis algorithm, image correction algorithm, resampling algorithm, utensil action identification algorithm, image capturing algorithm, artistic style algorithm, machine learning algorithm, artwork meta data algorithm, action-to-feature algorithm, computer vision algorithm, feature extraction algorithm, artistic style extraction algorithm, artistic style input algorithm, artistic style matching algorithm, and/or current haptic algorithm may be implemented using a machine learning model and/or may be used to train a machine learning model. A given machine learning model may be trained using the data flow 710 of FIG. 7. Training data 712 may include one or more of stage inputs 714 and known outcomes 718 related to a machine learning model to be trained. The stage inputs 714 may be from any applicable source including text, visual representations, data, values, comparisons, stage outputs (e.g., one or more outputs from a step from FIGS. 1*a*, 1*b*, 2*a*, 2*b*, 3 and/or 6). The known outcomes 718 may be included for machine learning models generated based on supervised or semi-supervised training. An unsupervised machine learning model may not be trained using known outcomes 718. Known outcomes 718 may include known or desired outputs for future inputs similar to or in the same category as stage inputs 714 that do not have corresponding known outputs. The training data 712 and a training algorithm 720 (e.g., creative tutorial algorithm, initialization algorithm, image creation analysis algorithm, image correction algorithm, resampling algorithm, utensil action identification algorithm, image capturing algorithm, artistic style algorithm, machine learning algorithm, artwork meta data algorithm, action-to-feature algorithm, computer vision algorithm, feature extraction algorithm, artistic style extraction algorithm, artistic style input algorithm, artistic style matching algorithm, and/or current haptic algorithm may be implemented using a machine learning model and/or may be used to train a machine learning model) may be provided to a training component 730 that may apply the training data 712 to the training algorithm 720 to generate a machine learning model. According to an implementation, the training component 730 may be provided comparison results 716 that compare a previous output of the corresponding machine learning model to apply the previous result to re-train the machine learning model. The comparison results 716 may be used by the training component 730 to update the corresponding machine learning model. The training algorithm 720 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

A machine learning model used herein may be trained and/or used by adjusting one or more weights and/or one or more layers of the machine learning model. For example, during training, a given weight may be adjusted (e.g., increased, decreased, removed) based on training data or input data. Similarly, a layer may be updated, added, or removed based on training data/and or input data. The resulting outputs may be adjusted based on the adjusted weights and/or layers.

In general, any process or operation discussed in this disclosure that is understood to be computer-implementable, such as the process illustrated in FIGS. 1*a*, 1*b*, 2*a*, 2*b*, 3 and/or 6, may be performed by one or more processors of a computer system as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices. One or more processors of a computer system may be included in a single computing device or distributed among a plurality of computing devices. One or more processors of a computer system may be connected to a data storage device. A memory of the computer system may include the respective memory of each computing device of the plurality of computing devices.

In various embodiments, one or more portions of methods 100, 200, 300, 400, and 500 may be implemented in, for instance, a chip set including a processor and a memory as shown in FIG. 8. FIG. 8 illustrates an implementation of a general computer system that may execute techniques presented herein. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices.

Unless specifically stated otherwise, as apparent from the following discussions, it is appreciated that throughout the specification, discussions utilizing terms such as "processing," "computing," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a personal trusted device, a web appliance, a network router, switch or bridge, or any other machine capable of executing a set of instructions (sequential or otherwise) that specify actions to be taken by that machine. In a particular implementation, the computer system 800 can be implemented using electronic devices that provide voice, video, or data communication. Further, while a computer system 800 is illustrated as a single system, the term "system" shall also be taken to include any collection of systems or sub-systems that individually or jointly execute a set, or multiple sets, of instructions to perform one or more computer functions. As illustrated in FIG. 8, the computer system 800 may include a processor 802, e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 804 includes a cache or random-access memory for the processor 802. In alternative implementations, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein may be performed by the processor 802 executing the instructions stored in the memory 804. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 800 may further include a display 810, such as a liquid crystal display (LCD), an organic light emitting diode (OLED), a flat panel display, a solid-state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 806.

Additionally or alternatively, the computer system 800 may include an input/output device 812 configured to allow a user to interact with any of the components of computer system 800. The input/output device 812 may be a number pad, a keyboard, or a cursor control device, such as a mouse, or a joystick, touch screen display, remote control, or any other device operative to interact with the computer system 800.

The computer system 800 may also or alternatively include drive unit 806 implemented as a disk or optical drive. The drive unit 806 may include a computer-readable medium 822 in which one or more sets of instructions 824, e.g. software, can be embedded. Further, instructions 824 may embody one or more of the methods or logic as described herein. The instructions 824 may reside completely or partially within the memory 804 and/or within the processor 802 during execution by the computer system 800. The memory 804 and the processor 802 also may include computer-readable media as discussed above.

In some systems, a computer-readable medium 822 includes instructions 824 or receives and executes instructions 824 responsive to a propagated signal so that a device connected to a network 870 can communicate voice, video, audio, images, or any other data over the network 870. Further, the instructions 824 may be transmitted or received over the network 870 via a communication port or interface 820, and/or using a bus 808. The communication port or interface 820 may be a part of the processor 802 or may be a separate component. The communication port or interface 820 may be created in software or may be a physical connection in hardware. The communication port or interface 820 may be configured to connect with a network 870, external media, the display 810, or any other components in computer system 800, or combinations thereof. The connection with the network 870 may be a physical connection, such as a wired Ethernet connection or may be established wirelessly as discussed below. Likewise, the additional connections with other components of the computer system 800 may be physical connections or may be established wirelessly. The network 870 may alternatively be directly connected to a bus 808.

While the computer-readable medium 822 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 822 may be non-transitory, and may be tangible.

The computer-readable medium 822 can include a solid-state memory such as a memory card or other package that houses one or more non-volatile read-only memories. The computer-readable medium 822 can be a random-access memory or other volatile re-writable memory. Additionally or alternatively, the computer-readable medium 822 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 800 may be connected to a network 870. The network 870 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 870 may include wide area networks (WAN), such as the Internet, local area networks (LAN), campus area networks, metropolitan area networks, a direct connection such as through a Universal Serial Bus (USB) port, or any other networks that may allow for data communication. The network 870 may be configured to couple one computing device to another computing device to enable communication of data between the devices. The network 870 may generally be enabled to employ any form of machine-readable media for communicating information from one device to another. The network 870 may include communication methods by which information may travel between computing devices. The network 870 may be divided into sub-networks. The sub-networks may allow access to all of the other components connected thereto or the sub-networks may restrict access between the components. The network 870 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present invention has been described above and is defined in the attached claims, it should be understood that the invention may alternatively be defined in accordance with the following embodiments:

1. A computer-implemented method (100) for generating an action-to-feature (193) mapping of a visual artwork (10), comprising:
    initializing (110) a system (300) to create a visual artwork in; and
    obtaining (120) an input stream of data (190) recording a creation of a visual artwork from the system; and
    identifying (130), based on the input stream of data (190), at least one time series of utensil actions (191) capable of reproducing the visual artwork; and
    obtaining (140) at least one image (192) of the visual artwork; and
    generating (150) the action-to-feature mapping (193) based on the at least one time series of utensil actions (191) and on the at least one image (192) of the visual artwork, thereby recognizing at least one artistic feature (194) of the visual artwork;
    wherein the action-to-feature mapping (193) comprises at least one pair of at least one utensil action (195) of the at least one time series of utensil actions (191) and the at least one artistic feature (194).

2. The method (100) of embodiment 1, wherein the visual artwork comprises a painting and/or a drawing.

3. The method (100) of embodiment 1 or 2, wherein the visual artwork comprises handwriting, a calligraphy, and/or a sculpture.

4. The method (100) of one of the preceding embodiments, wherein the system (300) comprises at least one smart utensil (330), wherein the at least one smart utensil comprises a smart pen (331), a smart brush (332), and/or a smart wrist device (333).

5. The method (100) of embodiment 4, wherein the data (190) comprises utensil track data comprising motion data of the at least one smart utensil (330).

6. The method (100) of one of the preceding embodiments, wherein the data (190) is in a machine-readable format.

7. The method (100) of one of the preceding embodiments, wherein the system (300) comprises a medium the visual artwork is created on or in.

8. The method (100) of embodiment 7, wherein the medium comprises a sheet of paper.

9. The method (100) of embodiment 7, when dependent on embodiment 4, wherein the medium comprises a digital sheet configured to be used with a smart utensil (330).

10. The method (100) of one of the preceding embodiments, wherein the system (300) comprises an image capturing subsystem (320), optionally at least one camera (350).

11. The method (100) of one of the embodiments 7 to 10, wherein initializing (110) the system (300) to create a visual artwork in comprises applying an initialization algorithm configured to establish a coordinate system of a portion of the medium.

12. The method (100) of embodiment 11, wherein the initialization algorithm is further configured:
    to prompt at least one user interaction via a user interface (360) of the system (300) guiding a user of the system to create at least one fiducial on or in the portion of the medium; and
    to receive a confirmation indicating that the at least one fiducial is completed via the user interaction.

13. The method (100) of embodiment 12, wherein each of the one or more fiducials comprises at least one line drawn or painted to define an edge or a corner so as to delimit the portion of the medium.

14. The method (100) of embodiment 13, wherein the initialization algorithm is further configured to recognize the portion of the medium delimited by the one or more fiducials, thereby establishing the coordinate system of the portion of the medium.

15. The method (100) of one of the embodiments 11 to 14, when dependent on embodiment 10, wherein the initialization algorithm is further configured to establish the coordinate system of the portion of the medium based on at least one image of the medium captured via the image capturing subsystem (320).

16. The method (100) of one of the preceding embodiments, when dependent on embodiment 4 and 11, wherein obtaining (120) the input stream of the data (190) recording the creation of the visual artwork from the system (300) comprises:
    recording at least one time series of utensil track data of the smart utensil (330) as the creation of the visual artwork progresses until completion; and
    identifying the at least one time series of utensil track data as the input stream of the data.

17. The method (100) of one of the preceding embodiments, when dependent on embodiment 15, wherein obtaining (120) the input stream of the data (190) recording the creation of the visual artwork from the system (300) comprises:
    capturing, via the image capturing subsystem (320), at least one time series of images as the creation of the visual artwork progresses until completion.

18. The method (100) of embodiment 17, wherein obtaining (120) the input stream of the data (190) recording the creation of the visual artwork from the system (300) comprises:
    applying an image creation analysis algorithm configured to determine at least one time series of utensil track data based on the at least one time series of images; and
    identifying the at least one time series of utensil track data as the input stream of the data.

19. The method (100) of embodiment 16 or 18, wherein the utensil track data comprise one or more utensil track data items of:
    a position of the smart utensil (330); and
    a direction of motion of the smart utensil; and
    an orientation of the smart utensil;
    a speed of motion of the smart utensil; and
    an acceleration of motion of the smart utensil; and
    a force acting on the smart utensil; and
    a mode of handling the smart utensil; and
    a mode of use of the smart utensil;
    optionally, in terms of the coordinate system.

20. The method (100) of embodiment 19 wherein the utensil track data comprises a timestamp.

21. The method (100) of embodiment 16 or 18 to 20, wherein the at least one time series of utensil track data is equidistantly sampled with respect to time.

22. The method (100) of one of the embodiments 16 to 20, when dependent on embodiment 20, wherein obtaining (120) the input stream of the data recording the creation of the visual artwork from the system (300) comprises applying a resampling algorithm configured to resample the time series of utensil track data based on an interpolation of the one or more utensil track data items between neighboring timestamps.

23. The method (100) of one of the preceding embodiments, wherein identifying (130), based on the input stream of data (190), the at least one time series of utensil actions (191) capable of reproducing the visual artwork comprises applying a utensil action identification algorithm configured to identify the at least one utensil action (195) in the input stream of data (190).

24. The method (100) of embodiment 23, when dependent on embodiment 19, wherein identifying the at least one utensil action (195) in the input stream comprises:
    gathering successive utensil track data in the time series of utensil track data until at least one utensil track data item substantially changes;
    thereby defining the at least one utensil action (195); wherein the at least one utensil track data item substantially changes, if a difference or an absolute difference of the at least one utensil track data item sampled at two successive sample points exceeds a first threshold.

25. The method (100) of embodiment 24, wherein the at least one utensil track data item is a position of the smart utensil (330).

26. The method (100) of one of the embodiments 23 to 25, when dependent on embodiment 19, wherein identifying at least one utensil action (195) in the input stream comprises:
    computing, based on the time series of utensil track data, at least one time series of derived quantity data.

27. The method (100) of embodiment 26, wherein computing, based on the time series of utensil track data, the at least one time series of derived quantity data is based on at least one feature of human writing, human drawing and/or human painting.

28. The method (100) of embodiment 26 or 27, wherein the derived quantity data comprise one or more derived quantity data items of:
    a class of what is drawn or painted; and
    a magnitude of what is drawn or painted.

29. The method (100) of embodiment 26 to 28, wherein identifying the at least one utensil action (195) in the input stream comprises:
    gathering successive derived quantity data in the time series of derived quantity data until at least one derived quantity data item substantially changes;
    thereby defining the at least one utensil action; wherein the at least one derived quantity data item substantially changes, if a difference or an absolute difference of the at least one derived quantity data item sampled at two successive sample points exceeds a second threshold.

30. The method (100) of one of the embodiments 23 to 29, when dependent on embodiment 20, wherein identifying the at least one utensil action (195) in the input stream comprises:
    gathering successive utensil track data in the time series of utensil track data until the timestamp substantially changes;
    thereby defining the at least one utensil action; wherein the timestamp substantially changes, if a difference or an absolute difference of the timestamp sampled at two successive sample points exceeds a third threshold.

31. The method (100) of one of the preceding embodiments, wherein obtaining (140) the at least one image (192) of the visual artwork comprises applying an image capturing algorithm configured:
    to prompt at least one user interaction via a user interface (360) of the system (300) guiding a user of the system to capture at least one image of the visual artwork; and
    to display the at least one captured image of the visual artwork via the user interface (360) comprising a graphical output (361); and
    to receive a confirmation indicating that the at least one image (192) is completed via the user interaction;
    thereby obtaining the at least one image of the visual artwork.

32. The method (100) of one of the preceding embodiments, wherein obtaining (140) the at least one image (192) of the visual artwork comprises applying an image capturing algorithm configured to reproduce the visual artwork based on the at least one time series of utensil actions (191), thereby obtaining the at least one image of the visual artwork.
33. The method (100) of one of the preceding embodiments, comprising applying (160) an artistic style algorithm configured to recognize at least one artistic style (196) for the at least one image (192) of the visual artwork.
34. The method (100) of embodiment 33, wherein the artistic style algorithm comprises applying a first machine learning algorithm configured to and trained for artistic style recognition.
35. The method (100) of one of the embodiments 33 or 34, wherein the artistic style algorithm is configured:
    to prompt at least one user interaction via a user interface (360) of the system (300) displaying the at least one recognized artistic style for the at least one image (192) of the visual artwork via the user interface (360); and
    to receive a confirmation indicating that the at least one recognized artistic style is correct or to receive an update for the at least one artistic style (196) via the user interaction;
    thereby recognizing the at least one artistic style.
36. The method (100) of one of the embodiments 33 to 35, wherein the artistic style algorithm is configured:
    to prompt at least one user interaction via a user interface (360) of the system (300) to specify at least one artistic style (196) for the at least one image (192) of the visual artwork via the user interface (360); and
    to receive at least one specified artistic style via the user interaction;
    thereby recognizing the at least one artistic style.
37. The method (100) of one of the preceding embodiments, comprising applying (170) an artwork meta data algorithm configured to recognize at least one item of artwork meta data (197) for the at least one image (192) of the visual artwork.
38. The method (100) of embodiment 37, wherein one or more items of artwork meta data (197) comprises one or more of:
    a difficulty level; and
    timing; and
    density of the at least one image (192); and
    finesse of the at least one image; and
    complexity of the at least one image; and
    technique; and
    description of objects; and
    keywords; and
    a comment.
39. The method (100) of embodiment 37 or 38, wherein the artwork meta data algorithm comprises applying a second machine learning algorithm configured to and trained for recognizing the one or more items of artwork meta data (197).
40. The method (100) of one of the embodiments 37 to 39, wherein the artwork meta data algorithm is configured:
    to prompt at least one user interaction via a user interface (360) of the system (300) displaying the at least one recognized item of artwork meta data (197) for the at least one image (192) of the visual artwork via the user interface (360); and
    to receive a confirmation indicating that the at least one item of artwork meta data is correct or to receive an update for the at least one item of artwork meta data via the user interaction;
    thereby recognizing the at least one item of artwork meta data.
41. The method (100) of one of the embodiments 37 to 40, wherein the artwork meta data algorithm is configured:
    to prompt at least one user interaction via a user interface (360) of the system (300) to specify at least one item of artwork meta data (197) for the at least one image (192) of the visual artwork via the user interface (360); and
    to receive at least one specified item of artwork meta data for the at least one image via the user interaction;
    thereby recognizing the at least one item of artwork meta data.
42. The method (100) of one of the preceding embodiments, wherein generating (150) the action-to-feature mapping (193) based on the at least one time series of utensil actions (191) and on the at least one image (192) of the visual artwork comprises applying an action-to-feature algorithm configured to recognize at least one artistic feature (194) of the visual artwork or of the at least one image of the visual artwork.
43. The method (100) of embodiment 42, wherein the action-to-feature algorithm comprises applying at least one computer vision algorithm, consisting of or comprising at least one third machine learning algorithm, configured to recognize the at least one artistic feature (194) of the visual artwork or of the at least one image (192) of the visual artwork.
44. The method (100) of embodiment 42 or 43, wherein the at least one artistic feature (194) comprises one or more of a dot, a cluster of dots, a line segment, an edge, an angle, a straight or curved line, a stroke, a brush, and/or a layer.
45. The method (100) of one of the embodiments 42 to 44, wherein recognizing the at least one artistic feature (194) of the visual artwork or of the at least one image (192) of the visual artwork comprises computing at least one artistic feature position of the at least one artistic feature.
46. The method (100) of one of the embodiments 42 to 45 wherein the action-to-feature algorithm is further configured to identify at least one utensil action (195) of the time series of utensil actions (191) for each artistic feature (194), thereby generating the action-to-feature mapping (193) comprising one or more pairs, wherein each pair comprises at least one utensil action of the at least one time series of utensil actions and the at least one artistic feature recognized for the utensil action.
47. The method (100) of embodiment 46, when dependent on embodiments 19 and 45, wherein identifying the at least one utensil action (195) of the time series of utensil actions (191) for each artistic feature (194) is based on the at least one artistic feature position and on a utensil track data item comprising a position of the smart utensil (330).
48. The method (100) of embodiment 46 or 47, when dependent on embodiments 19 and 20, wherein identifying the at least one utensil action (195) of the time series of utensil actions (191) for each artistic feature (194) is based on the utensil track data, optionally on one or more utensil track data items, and/or the timestamp.

49. The method (100) of one of the embodiments 47 to 48, when dependent on embodiment 26, wherein identifying the at least one utensil action (195) of the time series of utensil actions (191) for each artistic feature (194) is based on the at least one time series of derived quantity data.
50. The method (100) of one of the preceding embodiments, comprising storing (180) one or more of:
    the action-to-feature mapping (193); and
    the at least one artistic feature (194); and
    the at least one artistic style (196) of the at least one image of the visual artwork; and
    the at least one image (192) of the visual artwork (10); and
    the artwork meta data (197);
    the at least one time series of utensil actions (191);
    in an artistic style database (510) in a machine-readable format.
51. A computer-implemented method (200) for generating and running a creative tutorial algorithm (266) for creating a visual artwork (10), comprising:
    obtaining (210*a*) data (260) defining a creative objective (261) and identifying (210, 210*b*) the creative objective (261) based on the data (260) defining the creative objective; and
    obtaining (220*a*) information (262) about at least one targeted artistic style (263) and identifying (220, 220*b*) the at least one targeted artistic style (263) based on the information (262) about the at least one targeted artistic style; and
    accessing (230*a*) a plurality of predetermined artistic styles (264) and identifying (230, 230*b*), based on the plurality of predetermined artistic styles (264), at least one predetermined artistic style (196) matching the at least one targeted artistic style (263), thereby specifying at least one targeted predetermined artistic style (265); and
    generating (240) the creative tutorial algorithm (266);
    wherein the creative tutorial algorithm (266) is configured to comprise one or more instructions (267) on how to reproduce the creative objective (261) in terms of the at least one targeted predetermined artistic style (265).
52. The method (200) of embodiment 51, wherein the visual artwork comprises a painting or a drawing.
53. The method (200) of embodiment 51 or 52, wherein the visual artwork comprises a calligraphy or a sculpture.
54. The method (200) of one of the embodiments 51 to 53, wherein the creative objective (261) comprises an image or a photo.
55. The method (200) of one of the embodiments 51 to 54, wherein data (260) defining the creative objective (261) comprises an input image or an input photo.
56. The method (200) of embodiment 55, wherein obtaining (210*a*) the data (260) defining the creative objective (261) and identifying (210*b*) the creative objective based on the data defining the creative objective comprises applying the input image or the input photo to an image correction algorithm configured:
    to recognize at least one deficiency of the image; and
    to compute at least one correction to the at least one deficiency of the image; and
    to prompt a user interaction via a user interface (460) of a system (400) displaying the image and the at least one correction of the image; and
    to receive the at least one correction by a selection of the one or more corrections of the image via the user interaction;
    thereby modifying the input image, optionally the input photo, based on the selection.
57. The method (200) of embodiment 56, wherein a deficiency comprises one or more of perspective distortion, image misalignment, flashlight reflection, background artifacts, and color imbalance.
58. The method (200) of one of the embodiments 55 to 57, wherein obtaining (210*a*) the data (260) defining the creative objective (261) and identifying (210*b*) the creative objective based on the data defining the creative objective comprises applying the input image, optionally the input photo, to a feature extraction algorithm configured:
    to recognize and/or classify at least one feature of the image; and
    to prompt a user interaction via a user interface (460) of the system (400) displaying the image and highlighting one or more features in the image; and
    to receive at least one feature by a selection of the one or more features in the image via the user interaction;
    thereby modifying the input image, optionally the input photo, based on the selection.
59. The method (200) of one of the embodiments 55 to 58, wherein obtaining (210*a*) the data (260) defining the creative objective (261) and identifying (210*b*) the creative objective based on the data defining the creative objective comprises converting the creative objective to a vector graphics, thereby modifying the input image, optionally the input photo.
60. The method (200) of one of the embodiments 55 to 59, wherein identifying (210*b*) the creative objective (261) based on the data (260) defining the creative objective comprises identifying the input image, optionally the input photo, as the creative objective.
61. The method (200) of one of the embodiments 51 to 60, wherein information (262) about the at least one targeted artistic style (263) comprises a reference image.
62. The method (200) of embodiment 61, wherein the reference image comprises a reference painting.
63. The method (200) of embodiment 61 or 62, wherein the reference image comprises a reference drawing.
64. The method (200) of one of the embodiments 51 to 63, when dependent on embodiment 61, wherein identifying (220*b*) the at least one targeted artistic style based on the information (262) about the at least one targeted artistic style (263) comprises applying an artistic style extraction algorithm configured to recognize at least one artistic style of the reference image, thereby identifying the at least one targeted artistic style.
65. The method (200) of one of the embodiments 51 to 63, when dependent on embodiment 61, wherein obtaining (220*a*) the information (262) about the at least one targeted artistic style (263) and identifying (220*b*) the at least one targeted artistic style (263) based on the information (262) about the at least one targeted artistic style comprises applying an artistic style extraction algorithm configured:
    to recognize at least one artistic style of the reference image
    to prompt a user interaction via a user interface (460) of the system (400) displaying one or more recognized artistic styles of the reference image; and to receive the at least one artistic style by a selection of the one or more possible recognized artistic styles via the user interaction, thereby identifying the at least one targeted artistic style.

66. The method (200) of embodiment 64 or 65, wherein applying the artistic style extraction algorithm comprises applying a machine learning algorithm trained and configured for artistic style recognition.

67. The method (200) of one of the embodiments 64 to 66, wherein applying the artistic style extraction algorithm comprises querying a database.

68. The method (200) of one of the embodiments 51 to 67, wherein obtaining (220*a*) the information (262) about the at least one targeted artistic style (263) and identifying (220*b*) the at least one targeted artistic style (263) based on the information (262) about the at least one targeted artistic style comprises applying an artistic style input algorithm configured:

to suggest at least one artistic style; and to prompt a user interaction via a user interface (460) of the system (400) displaying one or more suggested artistic styles; and to receive the at least one artistic style by a selection of the one or more suggested artistic styles via the user interaction, thereby identifying the at least one targeted artistic style.

69. The method (200) of one of the embodiments 51 to 68, wherein information (262) about the at least one targeted artistic style (263) comprises at least one reference artistic style.

70. The method (200) of embodiment 69, wherein obtaining (220*a*) the information (262) about the at least one targeted artistic style (263) and identifying (220*b*) the at least one targeted artistic style based on the information about the at least one targeted artistic style comprises identifying the at least one reference artistic style as the at least one targeted artistic style.

71. The method (200) of one of the embodiments 61 to 70, wherein identifying (220*b*) the at least one targeted artistic style based on the information (262) about the at least one targeted artistic style (263) comprises converting the at least one targeted artistic style to a machine-readable format, optionally wherein the machine-readable format is compatible with a storage format of further artistic styles stored in an artistic style database (510).

72. The method (200) of one of the embodiments 51 to 71, wherein identifying (230*b*), based on the plurality of predetermined artistic styles, the at least one predetermined artistic style (196) matching the at least one targeted artistic style comprises applying an artistic style matching algorithm configured:

to compare the at least one targeted artistic style to at least one predetermined artistic style (196) of the plurality of predetermined artistic styles; and to identify the at least one predetermined artistic style (196) based on comparing the at least one targeted artistic style to at least one predetermined artistic style (196) of the plurality of predetermined artistic styles.

73. The method (200) of embodiment 72, wherein comparing the at least one targeted artistic style to the at least one predetermined artistic style (196) of the plurality of predetermined artistic styles (264) yields a score quantifying a congruence between the at least one targeted artistic style and the at least one predetermined artistic style (196) of the plurality of predetermined artistic styles (264).

74. The method (200) of embodiment 73, wherein the at least one predetermined artistic style (196) is identified based on a predetermined criterion, optionally, comprising the score.

75. The method (200) of one of the embodiments 72 to 74, wherein the artistic style matching algorithm is further configured:

to prompt a user interaction via a user interface (460) of the system (400) displaying one or more identified predetermined artistic styles; and to receive the at least one predetermined artistic style by a selection of the one or more possible identified artistic styles via the user interaction, thereby identifying the at least one predetermined artistic style.

76. The method (200) of embodiment 75, wherein the one or more possible identified artistic styles are filtered and/or ranked based on a predetermined criterion, and optionally according to the user interaction.

77. The method (200) of one of the embodiments 72 to 76, wherein accessing (230*a*) the plurality of predetermined artistic styles (264) comprises querying an artistic style database (510), preferably generated using the method (100) of embodiment 50.

78. The method (200) of one of the embodiments 72 to 77, wherein the at least one identified predetermined artistic style is identified (230*b*) as the at least one targeted predetermined artistic style (265).

79. The method (200) of one of the embodiments 51 to 78, wherein generating (240) the creative tutorial algorithm (266) comprises generating an ideal output image (270) reproducing the creative objective (261) in terms of the at least one targeted predetermined artistic style (265).

80. The method (200) of embodiment 79, wherein generating the ideal output image (270) comprises:

querying at least one artistic feature (194) stored for the at least one targeted predetermined artistic style (265) in an artistic style database (510) and queried therefrom; and integrating the at least one artistic feature in the ideal output image (270).

81. The method (200) of embodiment 79 or 80, wherein generating the ideal output image (270) comprises:

querying a predetermined image (192) corresponding to and representing the at least one targeted predetermined artistic style (265) from an artistic style database (510); and extracting from the predetermined image at least one artistic feature (194); and integrating the at least one artistic feature in the ideal output image (270).

82. The method (200) of embodiment 81, wherein the ideal output image (270) is identified with the predetermined image (192), if a similarity criterion comparing the predetermined image to the creative objective (261) is satisfied.

83. The method (200) of one of the embodiments 51 to 82, wherein generating (240) the creative tutorial algorithm (266) comprises generating the one or more instructions (267) on how to reproduce the creative objective (261) in terms of the at least one targeted predetermined artistic style (265).

84. The method (200) of embodiment 83, when dependent on embodiment 79, wherein generating the one or more instructions (267) is based on analyzing the ideal output image (270).

85. The method (200) of embodiment 83 or 84, when dependent on embodiment 79, wherein generating the one or more instructions (267) is based on how the ideal output image (270) is generated.

86. The method (200) of one of the embodiments 83 to 85, when dependent on embodiment 80, wherein generating the one or more instructions (267) comprises applying an action-to-feature mapping (193) stored for the at least one targeted predetermined artistic style (265) in the artistic style database (510) and queried therefrom to find at least one utensil action (195) for the at least one artistic feature (194).

87. The method (200) of embodiment 82, wherein generating the one or more instructions (267) comprises:
   querying at least one predetermined time series of utensil actions (191) capable of reproducing the predetermined image (192) from the artistic style database (510); and
   deriving the one or more instructions (267) based on the at least one predetermined time series of utensil actions (191).

88. The method (200) of one of the embodiments 79 to 87, wherein an instruction (267) details at least one utensil action of creating the visual artwork.

89. The method (200) of embodiment 88, wherein the at least one utensil action describes how to draw, paint, or create a dot, a line segment, a straight or curved line, a stroke, a brush, and/or a layer the ideal output image (270) is made of.

90. The method (200) of embodiment 89, wherein the description comprises one or more of:
   a specification as to which utensil (430, 440) is to be used; and
   a specification of the color or tone,
   a specification of the position and/or the direction
   a specification as to how much pressure to apply on the utensil; and
   a specification as to how fast to move the utensil.

91. The method (200) of embodiment 90, wherein a coordinate system relating to a plane the visual artwork is to be created in is defined.

92. The method (200) of one of the embodiments 51 to 91, wherein the one or more instructions (267) are grouped into at least one group of instructions.

93. The method (200) of one of the embodiments 51 to 92, wherein the one or more instructions (267) are organized into a hierarchy of groups or nested groups.

94. The method (200) of one of the embodiments 51 to 93, wherein an order of the one or more instructions (267) is computed.

95. The method (200) of embodiment 94, wherein the order is computed so as to avoid a succession of instructions (267) conflicting with each other in creating the artwork.

96. The method (200) of embodiment 94, when dependent on 87, wherein computing the order of the one or more instructions (267) comprises:
   querying the predetermined order of the one or more predetermined instructions from the artistic style database (510); and
   identifying the predetermined order as the order.

97. The method (200) of one of the embodiments 51 to 96, further comprising running (250*a*) and/or outputting (250, 250*b*) the creative tutorial algorithm (266).

98. The method (200) of embodiment 97, where the creative tutorial algorithm (266) is further configured to display one of the one or more instructions (267), when the one of the one or more instructions is due as creating the artwork progresses, thereby determining a current instruction (268).

99. The method (200) of embodiment 98, when dependent on embodiment 94, wherein the creative tutorial algorithm (266) is further configured:
   to prompt a user interaction via a user interface (460) of the system (400); and
   to receive a confirmation indicating that the current instruction (268) is completed; and
   to determine a next instruction (269) subsequent to the current instruction (268) according to the order of the one or more instructions; thereby determining the next instruction (269) as being due.

100. The method (200) of one of the embodiments 51 to 99, when dependent on embodiment 94, wherein outputting (250*b*) the creative tutorial algorithm (266) comprises displaying the one or more instructions (267) according to the order of the one or more instructions, optionally in terms of a list of instructions.

101. The method (200) of embodiment 99 or 100, where prompting the user interaction comprises:
   displaying the current instruction (268); and
   displaying a progressive list of instructions extended by the current instruction (268) as creating the artwork progresses.

102. The method (200) of one of the embodiments 99 to 101, wherein prompting the user interaction comprises:
   generating an audio signal encompassing verbal content of the current instruction (268); and
   playing this audio signal via at least one speaker of the user interface (460) of the system (400).

103. The method (200) of one of the embodiments 99 to 102, wherein prompting the user interaction comprises:
   generating a current haptic algorithm for a haptic feedback device (463) of a smart utensil (430) encoding the current instruction (268); and
   transmitting the current haptic algorithm to the haptic feedback device (463) via the user interface (460) of the system (400); and
   executing the current haptic algorithm on the haptic feedback device (463).

104. The method (200) of one of the embodiments 97 to 103, wherein the creative tutorial algorithm (266) is further configured to display the creative objective (261) on a graphical user interface (461) of the system (400).

105. The method (200) of one of the embodiments 97 to 104, when dependent on embodiment 79, where the creative tutorial algorithm (266) is further configured to display the ideal output image (270) on a graphical user interface (461).

106. The method (200) of embodiment 105, when dependent on embodiment 99, wherein the ideal output image (270) is displayed as the one or more constructions progress.

107. The method (200) of one of the embodiments 97 to 106, when dependent on embodiment 81, where the creative tutorial algorithm (266) is further configured to display the predetermined image (192) on a graphical user interface (461).

108. The method (200) of embodiment 107, when dependent on embodiment 98, wherein the current instruction (268) is exemplified in displaying a corresponding step in the predetermined image (192).

109. A system (300) for generating an action-to-feature mapping (193) of a visual artwork (10), wherein the system is configured to run the computer-implemented method (100) for generating the action-to-feature mapping (193) of a visual artwork according to one of the embodiments 1 to 50.

110. A system (400) for generating and running a creative tutorial algorithm (266) for a visual artwork (10), wherein the system is configured to run the computer-implemented method (200) for generating and running a creative tutorial algorithm (266) for creating a visual artwork according to one of the embodiments 51 to 108.

111. The system (300, 400) of embodiment 109 or 110, comprising:
an artwork subsystem (310, 410) configured to capture at least one action in creating the visual artwork; and
optionally, an image capturing subsystem (320, 420) configured to capture at least one image of the artwork.

112. The system (300, 400) of embodiment 111, wherein the artwork subsystem (310, 410) comprises a smart utensil (330, 430).

113. The system (300, 400) of embodiment 111, wherein the smart utensil (330, 430) comprises a smart pen (331, 431), a smart brush (332, 432), and/or a smart wrist device (333, 433).

114. The system (300, 400) of embodiment 112 or 113, wherein the smart utensil (330, 430) comprises at least one sensor (334, 434) configured to capture utensil track data of the smart utensil.

115. The system (300, 400) of embodiment 114, wherein the smart utensil (330, 430), optionally the at least one sensor (334, 434), comprises one or more of:
an accelerometer; and
a gyroscope; and
a magnetometer; and
a force sensor.

116. The system (300, 400) of one of the embodiments 109 to 115, wherein the artwork subsystem (310, 410) comprises a pen, a ballpoint pen, a fountain pen, a felt-tip pen, a pencil, a digital pen, a brush, a knife, a spatula, a palette knife, or a chisel (340, 440).

117. The system (300, 400) of one of the embodiments 109 to 116, wherein the artwork subsystem (310, 410) comprises at least one camera (350, 450) configured to track the motion of the smart utensil (330, 430), the pen, the ballpoint pen, the fountain pen, the felt-tip pen, the pencil, the digital pen, the brush, the knife, the spatula, the palette knife, or the chisel (340, 440), optionally wherein the pen, the ballpoint pen, the fountain pen, the felt-tip pen, the pencil, the digital pen, the brush, the knife, the spatula, the palette knife, or the chisel comprises a visual tracking feature (341, 441).

118. The system (300, 400) of one of the embodiments 109 to 117, wherein the image capturing subsystem (320, 420) comprises at least one camera (350, 450).

119. The system (300, 400) of embodiment 117 or 118, wherein the at least one camera (350, 450) is a camera of a smartphone (380, 480).

120. The system (300, 400) of one of the embodiments 117 to 119, wherein the at least one camera (350, 450) is mounted on the smart utensil (330, 430), the pen, the ballpoint pen, the fountain pen, the felt-tip pen, the pencil, the digital pen, the brush, the knife, the spatula, the palette knife, or the chisel (340, 440).

121. The system (300, 400) of one of the embodiments 109 to 120, wherein the system is further configured to run an image correction algorithm on at least one image of the artwork captured by the image capturing subsystem (320, 420).

122. The system (300, 400) of one of the embodiments 109 to 121, wherein the system, optionally the artwork subsystem, comprises at least one communication module configured to communicate with at least one artistic style database (510) via a data channel (520, 530).

123. The system (300, 400) of one of the embodiments 109 to 122, further comprising at least one user interface (360, 460).

124. The system (300, 400) of embodiment 123, wherein the at least one user interface (360, 460) comprises a graphical output (361, 461).

125. The system (300, 400) of embodiment 123 or 124, wherein the at least one user interface (360, 460) comprises an audio speaker (362, 462).

126. The system (300, 400) of one of the embodiments 123 to 125, when dependent on embodiment 112, wherein the at least one user interface (360, 460) comprises a haptic feedback device (363, 463) on the smart utensil (330, 430).

127. A distributed visual artwork system (500), comprising:
at least one first system (300) for generating an action-to-feature mapping (193) of a visual artwork according to one of the embodiments 109 to 126, when dependent on embodiment 109; and
at least one second system (400) for generating and running a creative tutorial algorithm (266) for a visual artwork according to one of the embodiments 109 to 126, when dependent on embodiment 110;
at least one artistic style database (510); and
wherein the at least one first system is configured to communicate with the at least one artistic style database (510) via a first data channel (520), and wherein the at least one second system is configured to communicate with the at least one artistic style database (510) via a second data channel (530).

128. The system (500) of embodiment 127, where the at least one first system (300) comprises the at least one second system (400).

129. The system (500) of embodiment 127 or 128, where the at least one second system (400) comprises the at least one first system (300).

130. The system (500) of one of the embodiments 127 to 129, wherein the first data channel (520) and/or second data channel (530) comprises one or more of a network, internet, a local area network, a wireless local area network, a broadband cellular network, and a wired network (540).

131. The system (500) of one of the embodiments 127 to 130, wherein the at least one artistic style database (510) is hosted on a server (541).

REFERENCE NUMERALS 10 visual artwork
100 computer-implemented method for generating an action-to-feature mapping of a visual artwork
110 initializing a system to create a visual artwork in
120 obtaining an input stream of data recording a creation of a visual artwork from the system
130 identifying at least one time series of utensil actions capable of reproducing the visual artwork
140 obtaining at least one image of the visual artwork
150 generating an action-to-feature mapping based on the at least one time series of utensil actions and on the at least one image of the visual artwork
160 applying an artistic style algorithm
170 applying an artwork meta data algorithm
180 storing
190 (input stream of) data recording a creation of a visual artwork
191 time series of utensil actions capable of reproducing the visual artwork
192 (predetermined) image of the visual artwork
193 action-to-feature mapping
194 artistic feature of the visual artwork
195 utensil action
196 artistic style
197 (item of) artwork meta data
200 computer-implemented method for generating and running a creative tutorial algorithm for creating a visual artwork
210a obtaining data defining a creative objective
210b identifying the creative objective based on the data defining the creative objective
210 210a and 210b
220a obtaining information about at least one targeted artistic style
220b identifying the at least one targeted artistic style based on the information about the at least one targeted artistic style
220 220a and 220b
230a accessing a plurality of predetermined artistic styles
230b identifying at least one predetermined artistic style matching the at least one targeted artistic style
230 230a and 230b
240 generating a creative tutorial algorithm
250a running the creative tutorial algorithm
250b outputting the creative tutorial algorithm
250 250a and 250b
260 data defining a creative objective
261 creative objective
262 information about at least one targeted artistic style
263 targeted artistic style
264 a plurality of predetermined artistic styles
265 targeted predetermined artistic style
266 creative tutorial algorithm
267 instruction
268 current instruction
269 next instruction
270 ideal output image
300 system for generating an action-to-feature mapping of a visual artwork
400 system for generating and running a creative tutorial algorithm for a visual artwork
310, 410 artwork subsystem
320, 420 image capturing subsystem
330, 430 smart utensil
331, 431 smart pen
332, 432 smart brush
333, 433 smart wrist device (e.g. a smart watch)
334, 434 sensor
340, 440 pen, ballpoint pen, fountain pen, felt-tip pen, pencil, digital pen, brush, knife, spatula, palette knife, or chisel
341, 441 visual tracking feature
350, 450 camera
360, 460 user interface
361, 461 graphical output
362, 462 audio speaker
363, 463 haptic feedback device
370, 470 communication module
380, 480 smartphone
500 a distributed visual artwork system
510 artistic style database
520 first data channel
530 second data channel
540 network, internet, local area network, wireless local area network, broadband cellular network, or wired network
541 server

The invention claimed is:

1. A computer-implemented method for generating and running a creative tutorial algorithm for an action-to-feature mapping of a visual artwork, comprising:
initializing a system to create the visual artwork by obtaining data defining a creative objective and obtaining information about at least one targeted artistic style from a plurality of predetermined artistic styles;
generating, via the creative tutorial algorithm, one or more instructions on how to reproduce the creative objective based on the at least one artistic style;
obtaining an input stream of data recording a creation of the visual artwork from the system;
identifying, based on the input stream of data, at least one time series of utensil actions capable of reproducing the visual artwork;
obtaining at least one image of the visual artwork; and
generating the action-to-feature mapping based on the at least one time series of utensil actions and on the at least one image of the visual artwork, thereby recognizing at least one artistic feature of the visual artwork,
wherein the action-to-feature mapping comprises at least one pair of the at least one artistic feature and at least one utensil action of the at least one time series of utensil actions, wherein the creative tutorial algorithm compares the at least one artistic feature to the creative objective based on the targeted artistic style, and wherein the system comprises at least one smart utensil, and wherein the at least one smart utensil comprises a smart pen, a smart wrist device for recording the creation of the visual artwork, a knife for creating the visual artwork, a spatula, a palette knife for creating the visual artwork, a chisel for modeling the visual artwork, at least one hand of a user for molding the visual artwork, or a combination thereof.

2. The computer-implemented method of claim 1, wherein the at least one smart utensil comprises a smart pen.

3. The computer-implemented method of claim 1, wherein the system comprises a medium the visual artwork is created on or in, and wherein initializing the system to create the visual artwork comprises applying an initialization algorithm configured to establish a coordinate system of a portion of the medium.

4. The computer-implemented method of claim 1, wherein obtaining the input stream of the data recording the creation of the visual artwork from the system comprises:
recording at least one time series of utensil track data of the smart utensil as the creation of the visual artwork progresses until completion, wherein the utensil track data comprise motion data of the smart utensil; and
identifying the at least one time series of utensil track data as the input stream of the data.

5. The computer-implemented method of claim 4, wherein the utensil track data comprise one or more utensil track data items of: a position of the smart utensil, a direction of motion of the smart utensil, an orientation of the smart utensil, a speed of the motion of the smart utensil, an acceleration of the motion of the smart utensil, a force acting on the smart utensil, a mode of handling the smart utensil, and a mode of use of the smart utensil.

6. The computer-implemented method of claim 5, wherein identifying, based on the input stream of data, the at least one time series of utensil actions capable of reproducing the visual artwork comprises:
applying a utensil action identification algorithm configured to identify the at least one utensil action in the input stream of data.

7. The computer-implemented method of claim 6, wherein identifying the at least one utensil action in the input stream comprises:
gathering successive utensil track data in the time series of utensil track data until at least one utensil track data item substantially changes to define the at least one utensil action,
wherein the at least one utensil track data item substantially changes, if a difference or an absolute difference of the at least one utensil track data item sampled at two successive sample points exceeds a first threshold.

8. The computer-implemented method of claim 7, wherein the at least one utensil track data item is the position of the smart utensil.

9. The computer-implemented method of claim 1, wherein obtaining the at least one image of the visual artwork comprises applying an image capturing algorithm configured for:
prompting at least one user interaction via a user interface of the system guiding a user of the system to capture the at least one image of the visual artwork;
displaying the at least one captured image of the visual artwork via the user interface comprising a graphical output; and
receiving a confirmation indicating that the at least one image is completed via the user interaction.

10. The computer-implemented method of claim 1, further comprising:
applying an artistic style algorithm configured to recognize at least one artistic style for the at least one image of the visual artwork.

11. The computer-implemented method of claim 10, comprising applying an artwork meta data algorithm configured to recognize at least one item of artwork meta data for the at least one image of the visual artwork.

12. The computer-implemented method of claim 11, comprising storing one or more of:
the action-to-feature mapping;
the at least one artistic feature;
the at least one artistic style of the at least one image of the visual artwork;
the at least one image of the visual artwork;
the artwork meta data; and
the at least one time series of utensil actions,
in an artistic style database.

13. The computer-implemented method of claim 1, wherein generating the action-to-feature mapping based on the at least one time series of utensil actions and on the at least one image of the visual artwork comprises:
applying at least one computer vision algorithm configured to recognize the at least one artistic feature of the visual artwork or of the at least one image of the visual artwork.

14. A system for generating and running a creative tutorial algorithm for an action-to-feature mapping of a visual artwork, comprising one or more servers configured to perform:
initializing the system to create the visual artwork by obtaining data defining a creative objective and obtaining information about at least one targeted artistic style from a plurality of predetermined artistic styles;
generating, via the creative tutorial algorithm, one or more instructions on how to reproduce the creative objective based on the at least one artistic style;
obtaining an input stream of data recording a creation of the visual artwork from the system;
identifying, based on the input stream of data, at least one time series of utensil actions capable of reproducing the visual artwork;
obtaining at least one image of the visual artwork; and
generating the action-to-feature mapping based on the at least one time series of utensil actions and on the at least one image of the visual artwork, thereby recognizing at least one artistic feature of the visual artwork,
wherein the action-to-feature mapping comprises at least one pair of the at least one artistic feature and at least one utensil action of the at least one time series of utensil actions, wherein the creative tutorial algorithm compares the at least one artistic feature to the creative objective based on the targeted artistic style, and wherein the system comprises at least one smart utensil, and wherein the at least one smart utensil comprises a smart pen, a smart wrist device for recording the creation of the visual artwork, a knife for creating the visual artwork, a spatula, a palette knife for creating the visual artwork, a chisel for modeling the visual artwork, at least one hand of a user for molding the visual artwork, or a combination thereof.

15. The system of claim 14, wherein the at least one smart utensil comprises a smart wrist device.

16. The system of claim 14, wherein obtaining the input stream of the data recording the creation of the visual artwork from the system comprises:
recording at least one time series of utensil track data of the smart utensil as the creation of the visual artwork progresses until completion, wherein the utensil track data comprise motion data of the smart utensil; and
identifying the at least one time series of utensil track data as the input stream of the data.

17. The system of claim 16, wherein the utensil track data comprise one or more utensil track data items of: a position of the smart utensil, a direction of motion of the smart utensil, an orientation of the smart utensil, a speed of the motion of the smart utensil, an acceleration of the motion of the smart utensil, a force acting on the smart utensil, a mode of handling the smart utensil, the mode of use of the smart utensil, or a combination thereof.

18. An apparatus to generate and run a creative tutorial algorithm for an action-to-feature mapping of a visual artwork, comprising:

at least one processor; and at least one memory including computer program code for one or more programs, the at least one memory and the computer program code configured to, with the at least one processor, cause the apparatus to perform at least the following, initialize a system to create a visual artwork by obtaining data defining a creative objective and obtaining information about at least one targeted artistic style from a plurality of predetermined artistic styles;

generate, via the creative tutorial algorithm, one or more instructions on how to reproduce the creative objective based on the at least one artistic style;

obtain an input stream of data recording a creation of the visual artwork from the system;

identify, based on the input stream of data, at least one time series of utensil actions capable of reproducing the visual artwork;

obtain at least one image of the visual artwork; and generate the action-to-feature mapping based on the at least one time series of utensil actions and on the at least one image of the visual artwork, thereby recognizing at least one artistic feature of the visual artwork, wherein the action-to-feature mapping comprises at least one pair of the at least one artistic feature and at least one utensil action of the at least one time series of utensil actions, wherein the creative tutorial algorithm compares the at least one artistic feature to the creative objective based on the targeted artistic style, and wherein the system comprises at least one smart utensil, and wherein the at least one smart utensil comprises a smart pen, a smart wrist device for recording the creation of the visual artwork, a knife for creating the visual artwork, a spatula, a palette knife for creating the visual artwork, a chisel for modeling the visual artwork, at least one hand of a user for molding the visual artwork, or a combination thereof.

19. The system of claim 14, wherein the at least one smart utensil comprises a knife.

20. The system of claim 14, wherein the at least one smart utensil comprises a spatula.

* * * * *